(12) United States Patent
Muraki et al.

(10) Patent No.: US 8,499,007 B2
(45) Date of Patent: Jul. 30, 2013

(54) INFORMATION PROCESSING SYSTEM, FIRST INFORMATION PROCESSING APPARATUS, SECOND INFORMATION PROCESSING APPARATUS, AND THIRD INFORMATION PROCESSING APPARATUS

(75) Inventors: Izumi Muraki, Tokyo (JP); Ryoichi Ichiyama, Tokyo (JP)

(73) Assignee: Kanata Limited, Tokyo (JP)

( * ) Notice: Subject to any disclaimer, the term of this patent is extended or adjusted under 35 U.S.C. 154(b) by 124 days.

(21) Appl. No.: 12/935,327

(22) PCT Filed: Nov. 16, 2009

(86) PCT No.: PCT/JP2009/006103
§ 371 (c)(1),
(2), (4) Date: Sep. 29, 2010

(87) PCT Pub. No.: WO2010/076844
PCT Pub. Date: Jul. 8, 2010

(65) Prior Publication Data
US 2011/0029568 A1    Feb. 3, 2011

(30) Foreign Application Priority Data

Dec. 30, 2008  (JP) ................................ 2008-335839

(51) Int. Cl.
*G06F 17/30* (2006.01)
(52) U.S. Cl.
USPC ........................................................ 707/792
(58) Field of Classification Search
USPC ........................................................ 707/792
See application file for complete search history.

(56) References Cited

U.S. PATENT DOCUMENTS

| 5,832,219 A * | 11/1998 | Pettus ........................... 709/203 |
| 2002/0152195 A1 * | 10/2002 | Bills et al. ........................ 707/1 |
| 2007/0067492 A1 | 3/2007 | Muraki et al. |

FOREIGN PATENT DOCUMENTS

| JP | 2005-258942 A | 9/2005 |
| JP | 2006-260343 A | 9/2006 |

OTHER PUBLICATIONS

Ken-ichi Ishii, et al., "Development and Evaluation of Web service application with Different Integration Schemes," IEICE Technical Report, Feb. 27, 2004, vol. 103, No. 692, pp. 107-112.
International Search Report for PCT Patent App. No. PCT/JP2009/006103 (Jan. 26, 2010).

* cited by examiner

*Primary Examiner* — Rehana Perveen
*Assistant Examiner* — Alexander Khong
(74) *Attorney, Agent, or Firm* — Cermak Nakajima LLP; Tomoko Nakajima

(57) ABSTRACT

The present invention provides an information processing system, including: a second non-existence case process information storage portion in which a pair of an object identifier and a non-existence case process identifier for identifying a process that is executed in a case where an object identified with the object identifier does not exist can be stored; a second receiving portion that receives result information transmitted by a first information processing apparatus; a second processing portion that executes the process identified with the non-existence case process identifier corresponding to the object identifier of the object, in a case where the result information received by the second receiving portion is information to the effect that the object does not exist; and a second output portion that outputs the result information, in a case where the result information is not information to the effect that the object does not exist.

18 Claims, 25 Drawing Sheets

FIG.5

| Node | Identifier | Logic/Data |
|---|---|---|
| "http:game_A" | / | |
| | /items | |
| | /items/lamp | |
| | /user | |
| | /user/taro | |
| | /user/taro/lamp | |
| | /user/taro/lamp/fuel | 25 |
| | /user/hanako | |
| | /user/kazuo | |
| | /user/kazuo/lamp | |

FIG.6

| Node | Identifier |
|---|---|
| ○─┐ | / |
| └○ | /price |
| └○ | /weight |
| └○ | /fuel |
| └○ | /state |
| └○ | /on |
| └○ | /off |
| └○ | /tick |

FIG.7

| ID | Non-existing node identifier | Non-existence case process identifier |
|---|---|---|
| 1 | /user/*/lamp | install(lamp,/user/*/);<br>buy_fuel(50);<br>light(/user/*/lamp); |
| 2 | /user/*/lamp/fuel | buy_fuel(50);<br>light(/user/*/lamp); |
| ⋮ | ⋮ | ⋮ |

FIG.8

```
For(all_users){
    IF "http://game_A/user/*/lamp" IS NOT EXIST{
        install(lamp,http://game_A/user/*/);
        buy_fuel(50);
        light(http://game_A/user/*/lamp);
    }
    ELSE IF "http://game_A/user/*/lamp/fuel" IS NOT EXIST{
        buy_fuel(50);
        light(http://game_A/user/*/lamp);
    }
    ELSE IF "http://game_A/user/*/lamp/fuel" = = 0{
        insert_fuel(50);
        light(http://game_A/user/*/lamp);
    }
    ELSE{
        light(http://game_A/user/*/lamp);
    }
}
```

FIG.12

| Node | Identifier |
|---|---|
| "http:game_A" ○┐ | / |
| └○┐ | /user |
| ├○ | /user/taro |
| ├○┐ | /user/hanako |
| │ ├○ | /user/hanako/hchild1 |
| │ ├○┐ | /user/hanako/hchild2 |
| │ └○ | /user/hanako/hahild2/hgch1 |
| └○┐ | /user/kazuo |
| ├○ | /user/kazuo/kchild1 |
| └○ | /user/kazuo/kchild2 |
| ⋮ | ⋮ |

FIG.13

| ID | Hierarchy level | Process identifier |
|---|---|---|
| 1 | 1 | create_1st_house |
| 2 | 2 | create_2nd_house |
| 3 | 3 or more | create_3rd_house |

FIG.14

```
level=GET_nest_level(http://game_A/user/Person)
IF(level= = 1) {
     create_1st_house(http://game_A/user/person);
}
IF(level= = 2) {
     create_2nd_house(http://game_A/user/Person);
}
IF(level|>= 3) {
     create_3rd_house(http://game_A/user/Person);
}
```

FIG.19

| Node | Identifier | Logic/Data |
|---|---|---|
| ○ | / | |
| ○ | /items | |
| ○ | /items/lamp | http://XXX/items/lamp |
| ○ | /user | |
| ○ | /user/taro | |
| ○ | /user/taro/lamp | |
| ○ | /user/taro/lamp/fuel | 25 |
| ○ | /user/hanako | http://XXX/user/hanako |
| ○ | /user/kazuo | |
| ○ | /user/kazuo/lamp | |
| ⋮ | ⋮ | ⋮ |

FIG.20

| Node | Identifier |
|---|---|
| ○ | / |
| ○ | /items |
| ○ | /items/lamp |
| ○ | /items/lamp/price |
| ○ | /items/lamp/weight |
| ○ | /items/lamp/fuel |
| ○ | /items/lamp/state |
| ○ | /items/lamp/on |
| ○ | /items/lamp/off |
| ○ | /items/lamp/tick |

INFORMATION PROCESSING SYSTEM, FIRST INFORMATION PROCESSING APPARATUS, SECOND INFORMATION PROCESSING APPARATUS, AND THIRD INFORMATION PROCESSING APPARATUS

This application is a national phase entry under 35 U.S.C. §371 of PCT Patent Application No. PCT/JP2009/006103, filed on Nov. 16, 2009, which claims priority under 35 U.S.C. §119 to Japanese Patent Application No. 2008-335839, filed Dec. 30, 2008, both of which are incorporated by reference.

TECHNICAL FIELD

The present invention relates to information processing systems and the like preferably used, for example, in the case where distributed development is performed for a program that operates on a network.

BACKGROUND ART

Conventionally, there is an information processing apparatus that can reduce a load of designing or operation of a network application (see PTL 1, for example). This information processing apparatus is an information processing apparatus that exchanges information with another apparatus via a network, including: a storage unit in which multiple objects are stored that are represented using a tree structure with multiple nodes, that are provided with a unique address indicating a position thereof in which identifying information for identifying itself in a network is coupled with object positional information indicating a position from a highest-level node to its own node in the tree structure by successively indicating name information indicating names of the respective nodes according to the tree structure, and that are provided with a data writing area for the address; an exchange unit that exchanges information represented by an external language via a network with another apparatus, and that sequentially processes a request for at least one of calling, writing, deletion, and partial change of an object having a designated address and stored in the storage unit; and an engine unit including a first conversion unit that acquires at least one object represented by an external language via a network together with a process request, and that converts the acquired object into information represented by an internal language while maintaining the tree structure of the acquired object, a control unit that interprets an address of a requested object, and that executes a requested process on the object of the interpreted address, and a second conversion unit that converts an object stored in the storage unit into an external language while maintaining the tree structure of the object.

CITATION LIST

Patent Literature

PTL 1: JP 2005-258942A (p. 1, FIG. 1, etc.)

DISCLOSURE OF INVENTION

Problems to be Solved by the Invention

However, in a conventional information processing apparatus, in the case where a program is developed using an application (or an object) existing in a remote information processing apparatus, it is assumed that the application exists. Accordingly, in the case where a large number of programmers jointly develop one object or program on a large number of information processing apparatuses, for example, if the application or the object is temporarily deleted, is subjected to name (identifier) change, or does not operate, the entire program does not properly operate.

Furthermore, in a conventional information processing apparatus, it is not assumed that a proper processing result is obtained by executing different processes depending on the structure of an object existing in a remote information processing apparatus. Accordingly, it is difficult to develop an application sufficiently utilizing advantages of a hierarchical object.

Moreover, it is not possible to construct an object including nodes existing in two or more apparatuses in a distributed manner, by linking any node of an object existing in one information processing apparatus with an object or an application (also including a node) developed in another information processing apparatus. Accordingly, it is not possible to sufficiently improve the efficiency of distributed development of a program.

Means for Solving the Problems

A first aspect of the present invention is directed to an information processing system, including a first information processing apparatus and a second information processing apparatus, wherein the first information processing apparatus includes: a first object storage portion in which at least one object having at least one data node and at least one application node that are hierarchical can be stored; a first instruction receiving portion that receives an object instruction, which is an instruction having an object identifier for identifying an object and is an instruction for the object, from the second information processing apparatus; a first object non-existence information acquiring portion that acquires information to an effect that the object identified with the object identifier contained in the object instruction does not exist, in a case where the object does not exist; a first processing portion that processes the object identified with the object identifier contained in the object instruction according to the object instruction, in a case where the object exists; and a first transmitting portion that transmits result information, which is information acquired by the first object non-existence information acquiring portion or information on a result of the process executed by the first processing portion, to the second information processing apparatus; and the second information processing apparatus includes: a second non-existence case process information storage portion in which a pair of an object identifier and a non-existence case process identifier for identifying a process that is executed in a case where an object identified with the object identifier does not exist can be stored; a second receiving portion that receives the result information transmitted by the first information processing apparatus; a second processing portion that executes the process identified with the non-existence case process identifier corresponding to the object identifier of the object, in a case where the result information received by the second receiving portion is information to an effect that the object does not exist; and a second output portion that outputs the result information received by the second receiving portion, in a case where the result information is not information to an effect that the object does not exist.

With this configuration, even in a case where an object that is to exist in an external information processing apparatus does not exist, a program using the object does not cause an error, and the operation can be continued.

Furthermore, a second aspect of the present invention is directed to the information processing system according to the first aspect, wherein a non-existence case process identifier for identifying a process that is executed in a case where information to an effect that the object does not exist is obtained is stored in the second non-existence case process information storage portion, and the second processing portion executes the process identified with the non-existence case process identifier stored in the second non-existence case process information storage portion, in a case where the result information received by the second receiving portion is information to an effect that the object does not exist.

With this configuration, even in a case where an object that is to exist in an external information processing apparatus does not exist, a program using the object does not cause an error, and a default operation can be executed.

Furthermore, a third aspect of the present invention is directed to an information processing system, including a first information processing apparatus and a second information processing apparatus, wherein the first information processing apparatus includes: a first object storage portion in which at least one object having at least one data node and at least one application node that are hierarchical can be stored; a first instruction receiving portion that receives an object instruction, which is an instruction having an object identifier for identifying an object and is an instruction for the object, from the second information processing apparatus; a first structure information acquiring portion that acquires the object identified with the object identifier contained in the object instruction or structure information, which is information relating to a structure of the object identified with the object identifier contained in the object instruction; and a first transmitting portion that transmits the object or the structure information acquired by the first structure information acquiring portion to the second information processing apparatus; and the second information processing apparatus includes: a second receiving portion that receives the object or the structure information transmitted by the first information processing apparatus; a second processing portion that executes different processes depending on structure information acquired from the object received by the second receiving portion, or the structure information received by the second receiving portion; and a second output portion that outputs a result of the process executed by the second processing portion.

With this configuration, a process according to the structure of the object can be executed.

Furthermore, a fourth aspect of the present invention is directed to the information processing system according to the third aspect, wherein the second processing portion includes: a structure and process information storage unit in which at least two pieces of structure and process information having a pair of a depth of a hierarchical structure of the object and a process identifier for identifying a process are stored; and a process executing unit that executes the process identified with the process identifier corresponding to the depth of the hierarchical structure indicated by the structure information.

With this configuration, a process according to the structure of the object can be executed.

Furthermore, a fifth aspect of the present invention is directed to the information processing system according to any one of the first to the fourth aspects, further including a third information processing apparatus, wherein the third information processing apparatus includes: a third object storage portion in which at least one object having a link from a node of one object of the first object storage portion can be stored; a third instruction receiving portion that receives a link node group instruction, which is an instruction for a link-destination node, or the link-destination node and a node group therebelow, from the first information processing apparatus; a third processing portion that executes a process corresponding to the link node group instruction, and acquires a processing result; and a third transmitting portion that transmits the processing result to the first information processing apparatus; the second information processing apparatus further includes: a second accepting portion that accepts the link node group instruction; and a second instruction transmitting portion that transmits the link node group instruction to the first information processing apparatus; the first information processing apparatus further includes: a first instruction receiving portion that receives the link node group instruction; a first link object judging portion that judges whether or not an object corresponding to the link node group instruction is a link object; a first link node group instruction transmitting portion that transmits the link node group instruction to the third information processing apparatus, which is a link-destination apparatus of the link object, in a case where the first link object judging portion judges that the object is the link object; and a first link-destination node group processing result receiving portion that receives a processing result of a link node group from the third information processing apparatus in response to transmission of the link node group instruction; the first processing portion acquires result information, which is the processing result or a result of a process executed according to the processing result, and the first transmitting portion transmits the result information to the second information processing apparatus.

With this configuration, the efficiency of distributed joint development of a program can be improved.

Furthermore, a sixth aspect of the present invention is directed to the information processing system according to any one of the first to the fourth aspects, further including a third information processing apparatus, wherein the third information processing apparatus includes: a third object storage portion in which at least one object having a link from a node of one object of the first object storage portion can be stored; a third instruction receiving portion that receives a link node group instruction, which is an instruction for a link-destination node, or the link-destination node and a node group therebelow, from the second information processing apparatus; a third processing portion that executes a process corresponding to the link node group instruction, and acquires a processing result; and a third transmitting portion that transmits the processing result to the second information processing apparatus; the second information processing apparatus further includes: a second accepting portion that accepts the link node group instruction; and a second instruction transmitting portion that transmits the link node group instruction to the first information processing apparatus; the second receiving portion receives a link-destination node identifier for identifying the link-destination node from the first information processing apparatus in response to transmission of the link node group instruction, the second information processing apparatus further comprises a second transmitting portion that transmits the link node group instruction, which is an instruction to process a link-destination node group identified with the link-destination node identifier, to the third information processing apparatus corresponding to the link-destination node identifier, the second receiving portion receives the processing result from the third information processing apparatus in response to transmission of the link node group instruction, the second output portion outputs the result information received by the second receiving portion, and the first information processing apparatus further includes: a first instruction receiving portion that receives the link node group instruction; a first link object judging portion that judges whether or not an object corresponding to the link node group instruction is a link object; and a first link node group instruction transmitting portion that transmits a link-destination node identifier for identifying the link-destination node to the second information processing apparatus, in a case where the link object judging portion judges that the object is the link object.

With this configuration, the efficiency of distributed joint development of a program can be improved.

EFFECT OF THE INVENTION

With the information processing system according to the present invention, a program can be developed utilizing advantages of a hierarchical object.

BRIEF DESCRIPTION OF THE DRAWINGS

FIG. 5 is a diagram showing an object of this embodiment.

FIG. 6 is a diagram showing an object of this embodiment.

FIG. 7 is a diagram showing a non-existence case process information management table in this embodiment.

FIG. 8 is a diagram showing an example of a program in this embodiment.

FIG. 12 is a diagram showing an object of this embodiment.

FIG. 13 is a diagram showing a structure and process information management table in this embodiment.

FIG. 14 is a diagram showing an example of a program in this embodiment.

FIG. 19 is a diagram showing an object of this embodiment.

FIG. 20 is a diagram showing an object of this embodiment.

EMBODIMENTS FOR CARRYING OUT THE INVENTION

Figure 1:
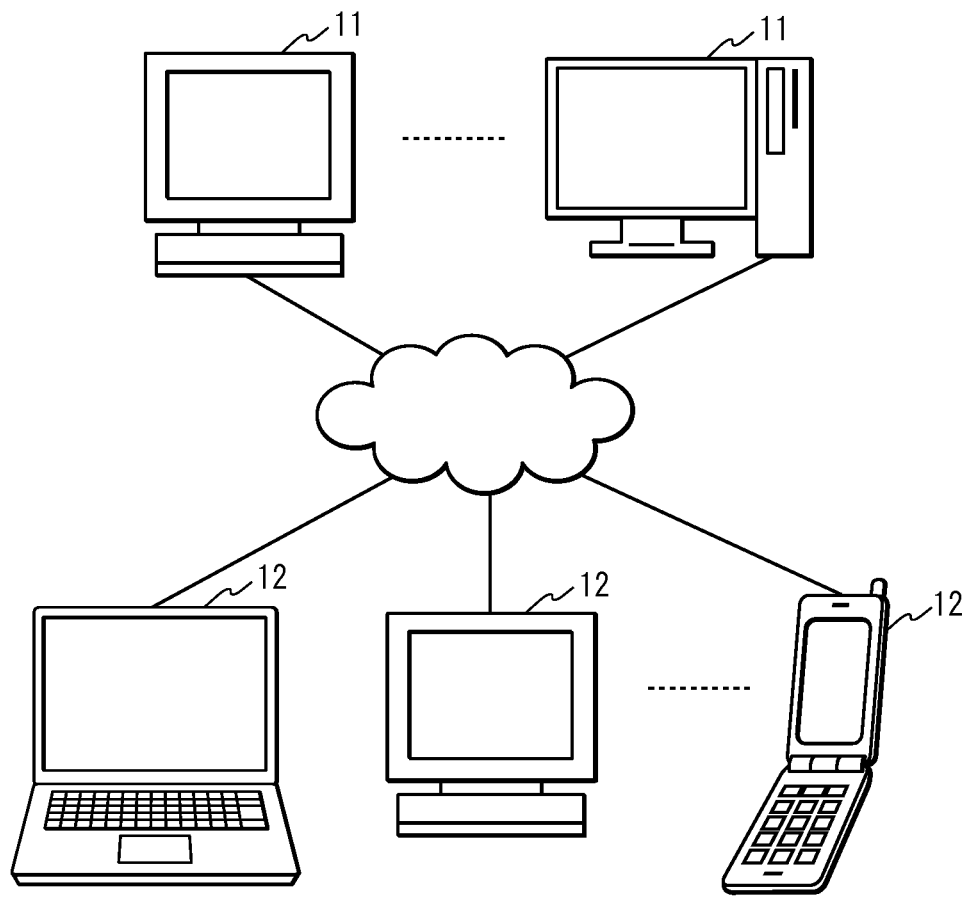
FIG. 1 is a conceptual diagram of an information processing system 1 in Embodiment 1.

Hereinafter, embodiments of an information processing system and the like will be described with reference to the drawings. It should be noted that constituent components denoted by the same reference numerals in the embodiments execute similar operations, and, thus, a description thereof may not be repeated.

Embodiment 1

In this embodiment, an information processing system will be described that is provided with a first information processing apparatus in which an object is stored, and a second information processing apparatus that executes a process using the object. The second information processing apparatus acquires information on whether or not an object exists. Then, the information processing system executes different processes between the case where an object exists and the case where an object does not exist. The definition of an object will be described later.

FIG. 1 is a conceptual diagram of an information processing system 1 in this embodiment. The information processing system 1 is provided with first information processing apparatuses 11 and second information processing apparatuses 12.

Figure 2:
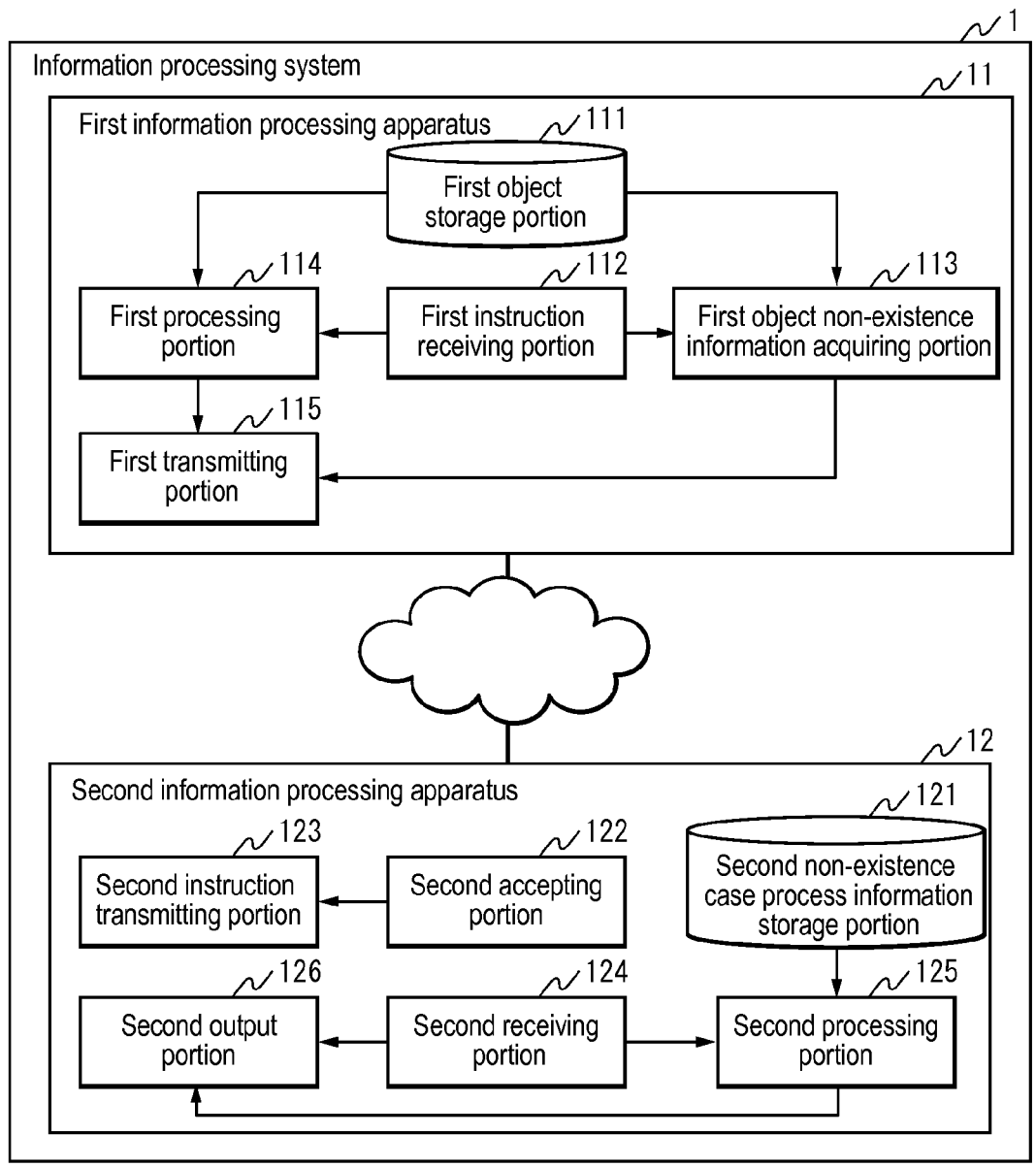
FIG. 2 is a block diagram of the information processing system of this embodiment.

FIG. 2 is a block diagram of the information processing system 1 in this embodiment. The first information processing apparatus 11 is provided with a first object storage portion 111, a first instruction receiving portion 112, a first object non-existence information acquiring portion 113, a first processing portion 114, and a first transmitting portion 115.

The second information processing apparatus 12 is provided with a second non-existence case process information storage portion 121, a second accepting portion 122, a second instruction transmitting portion 123, a second receiving portion 124, a second processing portion 125, and a second output portion 126.

In the first object storage portion 111, one or more objects can be stored. An object typically has two or more hierarchical nodes. The object may also be one node. The node is data or an application. The data may also be referred to as information. Examples of the type of the data include text, still images, moving images, sounds, and information obtained by combining these. There is no limitation on the type of the data. Furthermore, the data is typically a file, but there is no limitation on the structure thereof. Moreover, there is no limitation on the format of the data, and examples thereof include text, HTML, XML, jpeg, and gif. Furthermore, the application is information such as a program, a module, or a method, and is different from mere data. The application is also referred to as a logic or a program as appropriate. The application is a group of commands to execute some sort of operation. Examples of the application include those in a format that can be executed by a computer without any modification (an execution module, a program that can be executed by an interpreter, etc.), and those in a format that can be executed after conversion (compiling, decoding, etc.). That is to say, there is no limitation on the format of the application. Furthermore, information for specifying an object is referred to as an object identifier. Furthermore, information for specifying a node is referred to as a node identifier. The object identifier preferably includes the node identifier. A group of nodes is an object. A group of nodes from a highest-level node to all lowest-level nodes is also referred to as an object, but it is assumed that a subset of a node group constituting a hierarchical structure is also referred to as an object. The first object storage portion 111 is preferably a non-volatile storage medium, but may also be realized as a volatile storage medium. There is no limitation on the procedure in which the object is stored in the first object storage portion 111. For example, the object may be stored in the first object storage portion 111 via a storage medium, the object transmitted via a communication line or the like may be stored in the first object storage portion 111, or the object input via an input device may be stored in the first object storage portion 111.

The first instruction receiving portion 112 receives an object instruction from the second information processing apparatus 12. The object instruction is an instruction for an object, and, for example, is an instruction to process an object. Here, there is no limitation on the process as long as it is a process using an object, such as update, deletion, or acquisition. The object instruction typically has an object identifier for identifying an object. The object identifier contained in the object instruction may be an identifier for a node constituting an object. The first instruction receiving portion 112 is realized typically as a wireless or wired communication unit, but may also be realized as a unit that receives a broadcast.

In the case where the object identified with the object identifier contained in the object instruction does not exist, the first object non-existence information acquiring portion 113 acquires information to the effect that the object does not exist. Here, the acquisition may be any process that acquires, as a result, information to the effect that the object does not exist. The phrase "object does not exist" refers to, for example, a state in which an object identified with the object identifier does not exist at a location specified with the object identifier. The first object non-existence information acquiring portion 113 searches the first object storage portion 111, for example, using the object identifier as a key, and, if the object cannot be retrieved, acquires information to the effect that the object does not exist. The first object non-existence information acquiring portion 113 can be realized typically as an MPU, a memory, or the like. Typically, the processing procedure of the first object non-existence information acquiring portion 113 is realized by software, and the software is stored in a storage medium such as a ROM. Note that the processing procedure may be realized also by hardware (a dedicated circuit).

In the case where the object identified with the object identifier contained in the object instruction exists, the first processing portion 114 processes the object according to the object instruction. The first processing portion 114 may execute a process that acquires information to the effect that the object identified with the object identifier contained in the object instruction exists. The first processing portion 114, for example, holds a program, a method, an execution module, or the like for processing an object. The first processing portion 114 can be realized typically as an MPU, a memory, or the like. Typically, the processing procedure of the first processing portion 114 is realized by software, and the software is stored in a storage medium such as a ROM. Note that the processing procedure may be realized also by hardware (a dedicated circuit).

The first transmitting portion 115 transmits result information to the second information processing apparatus 12. The result information is information acquired by the first object non-existence information acquiring portion 113. Alternatively, the result information is information on a result of the process executed by the first processing portion 114. The first transmitting portion 115 is realized typically as a wireless or wired communication unit, but may also be realized as a broadcasting unit.

In the second non-existence case process information storage portion 121, a pair of an object identifier and a non-existence case process identifier can be stored. The object identifier is not limited to information for specifying only one object, and may also be information for specifying two or more objects. The non-existence case process identifier is information for identifying a process that is executed in the case where the object identified with the object identifier does not exist. The non-existence case process identifier is a method name, a function name, a message name, an execution module name, or the like. The object identifier and the non-existence case process identifier may also be embedded in a program. Here, as appropriate, information on a pair of the object identifier and the non-existence case process identifier is referred to as non-existence case process information. Furthermore, in the second non-existence case process information storage portion 121, only the non-existence case process identifier may be stored. Also in this case, the non-existence case process information is considered to have a pair of an empty object identifier and a non-existence case process identifier. In the case where only the non-existence case process identifier is stored in the second non-existence case process information storage portion 121, if any object does not exist, the process identified with the non-existence case process identifier is executed. The second non-existence case process information storage portion 121 is preferably a non-volatile storage medium, but may also be realized as a volatile storage medium. There is no limitation on the procedure in which the non-existence case process information is stored in the second non-existence case process information storage portion 121. For example, the non-existence case process information may be stored in the second non-existence case process information storage portion 121 via a storage medium, the non-existence case process information transmitted via a communication line or the like may be stored in the second non-existence case process information storage portion 121, or the non-existence case process information input via an input device may be stored in the second non-existence case process information storage portion 121.

The second accepting portion 122 accepts various instructions. Here, the acceptance also includes reading of an instruction (including a command and the like) described in a file, acceptance of input from a user, acceptance of an instruction from an external apparatus, acceptance of an instruction from another program, acceptance of an instruction from another function, and acceptance of an instruction from another method. The instruction is, for example, an object instruction or a link node group instruction. The link node group instruction is an instruction to process a link node group, and can be considered as a type of object instruction. The link node group can be referred to as an object constituting an object. The object constituting an object is part of an object, and is a hierarchical node group. The object constituting an object can also be referred to as a subobject, but may be referred to as an object. Furthermore, the link node group is an object stored in a remote apparatus on a network. As an input unit of various instructions, any unit may be used such as a keyboard, a mouse, a numeric keypad, a menu screen, and the like. The second accepting portion 122 may be realized as a device driver for an input unit, such as a keyboard, or control software for a menu screen, for example.

The second instruction transmitting portion 123 transmits the instruction accepted by the second accepting portion 122

(e.g., the object instruction or the link node group instruction) to the first information processing apparatus 11. The format, the content, and the like of the instruction accepted by the second accepting portion 122 may be different from those of the instruction transmitted by the second instruction transmitting portion 123. The second instruction transmitting portion 123 is realized typically as a wireless or wired communication unit, but may also be realized as a broadcasting unit.

The second receiving portion 124 receives the result information transmitted by the first information processing apparatus 11. The second receiving portion 124 typically receives the result information from the first information processing apparatus 11 in response to transmission of the link node group instruction by the second instruction transmitting portion 123. The second receiving portion 124 is realized typically as a wireless or wired communication unit, but may also be realized as a unit that receives a broadcast.

In the case where the result information received by the second receiving portion 124 is information to the effect that the object does not exist, the second processing portion 125 executes the process identified with the non-existence case process identifier corresponding to the object identifier of the object. The non-existence case process identifier is stored in the second non-existence case process information storage portion 121. Here, in the second processing portion 125, for example, a function, a method, an execution module, and the like identified with the non-existence case process identifier are stored. Furthermore, in the case where the result information received by the second receiving portion 124 is information to the effect that the object does not exist, the second processing portion 125 may execute the process identified with the non-existence case process identifier stored in the second non-existence case process information storage portion 121. The second processing portion 125 can be realized typically as an MPU, a memory, or the like. Typically, the processing procedure of the second processing portion 125 is realized by software, and the software is stored in a storage medium such as a ROM. Note that the processing procedure may be realized also by hardware (a dedicated circuit).

In the case where the result information received by the second receiving portion 124 is not information to the effect that the object does not exist, the second output portion 126 outputs the result information. Here, output is a concept that includes display on a display screen, projection using a projector, printing in a printer, outputting a sound, transmission to an external apparatus, accumulation in a storage medium, delivery of a processing result to another processing apparatus or another program, and the like. The second output portion 126 may be considered to include or not to include an output device, such as a display screen or a loudspeaker. The second output portion 126 may be realized as driver software for an output device, or a combination of driver software for an output device and the output device.

Next, an operation of the information processing system 1 will be described. First, an operation of the first information processing apparatus 11 will be described with reference to the flowchart in FIG. 3.

(Step S301) The first instruction receiving portion 112 judges whether or not the object instruction has been received from the second information processing apparatus 12. If the object instruction has been received, the procedure advances to step S302. If the object instruction has not been received, the procedure advances to step S301.

(Step S302) The first object non-existence information acquiring portion 113 acquires the object identifier contained in the object instruction received in step S301.

(Step S303) The first object non-existence information acquiring portion 113 searches the first object storage portion 111 using, as a key, the object identifier acquired in step S302.

(Step S304) The first object non-existence information acquiring portion 113 judges whether or not the object identified with the object identifier exists in the first object storage portion 111 as a result of the search in step S303. If the object exists, the procedure advances to step S305. If the object does not exist, the procedure advances to step S306.

(Step S305) The first processing portion 114 executes the process corresponding to the object instruction received in step S301, on the object identified with the object identifier. Then, the first processing portion 114 substitutes a result of the process for the result information.

(Step S306) The first object non-existence information acquiring portion 113 substitutes information to the effect that the object does not exist for the result information.

(Step S307) The first transmitting portion 115 transmits the result information to the second information processing apparatus 12. The procedure returns to step S301.

Figure 3:
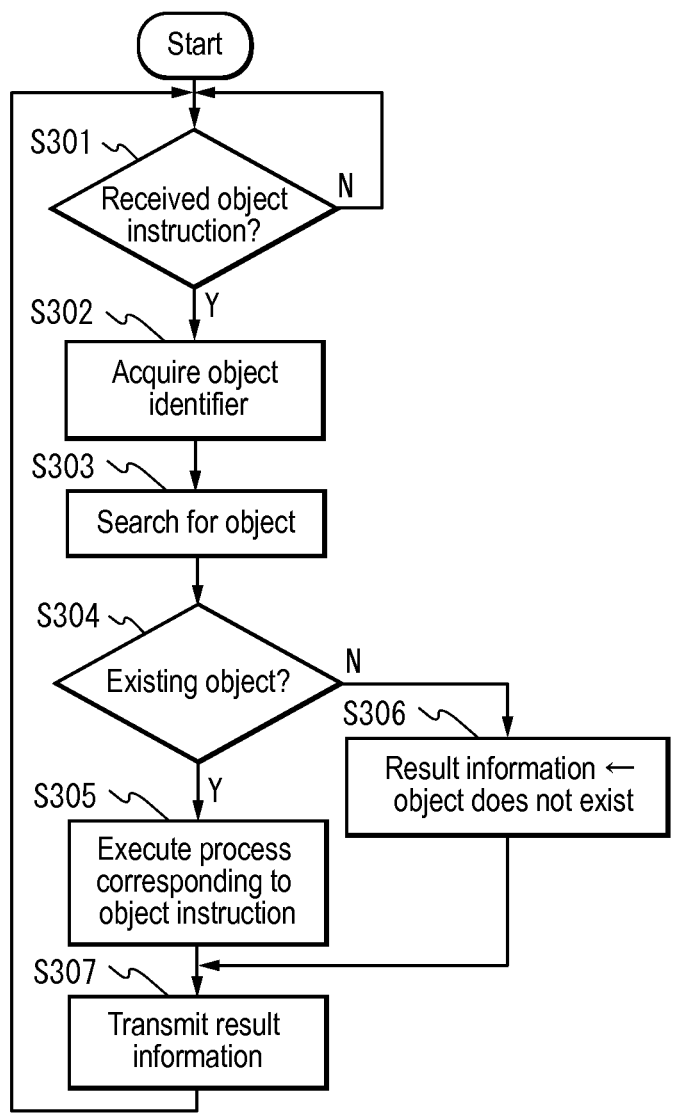
FIG. 3 is a flowchart illustrating an operation of a first information processing apparatus of this embodiment.

Here, the process is terminated by powering off or an interruption to abort the process in the flowchart in FIG. 3.

Next, an operation of the second information processing apparatus 12 will be described with reference to the flowchart in FIG. 4.

(Step S401) The second accepting portion 122 judges whether or not the object instruction has been accepted. If the object instruction has been accepted, the procedure advances to step S402. If the object instruction has not been accepted, the procedure advances to step S403. Here, the acceptance also includes acceptance of input from a user, reading of a file, reception, and reception from an external apparatus.

(Step S402) The second instruction transmitting portion 123 transmits the instruction accepted in step S401 to the first information processing apparatus 11. The procedure returns to step S401. Here, it will be appreciated that the structure and the like of the accepted instruction may be different from those of the transmitted instruction.

(Step S403) The second receiving portion 124 judges whether or not the result information has been received from the first information processing apparatus 11. If the result information has been received, the procedure advances to step S404. If the result information has not been received, the procedure returns to step S401.

(Step S404) The second processing portion 125 judges whether or not the result information received in step S403 is information to the effect that the object does not exist. If the result information is information to the effect that the object does not exist, the procedure advances to step S405. If the result information is not information to the effect that the object does not exist, the procedure advances to step S406.

(Step S405) The second processing portion 125 acquires the non-existence case process identifier corresponding to the object identifier contained in the object instruction, from the second non-existence case process information storage portion 121.

(Step S406) The second output portion 126 outputs the result information received in step S403. The procedure returns to step S401.

(Step S407) The second processing portion 125 executes the process corresponding to the non-existence case process identifier acquired in step S405. The procedure returns to step S401.

Figure 4:
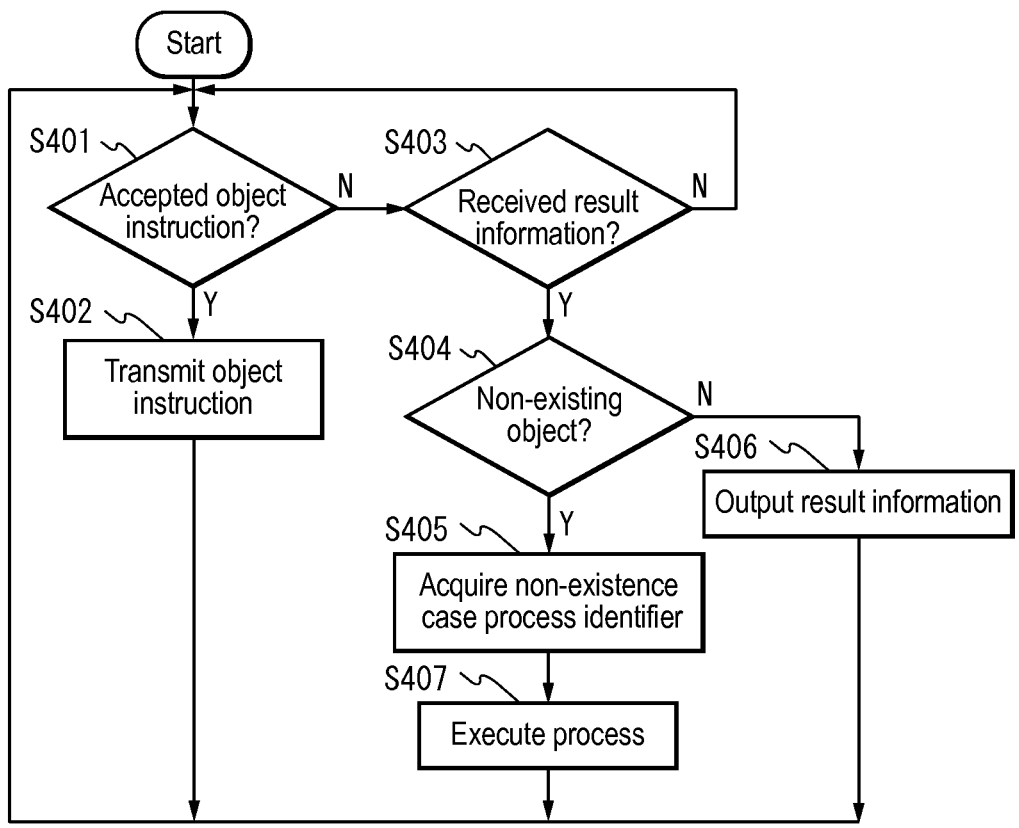
FIG. 4 is a flowchart illustrating an operation of a second information processing apparatus of this embodiment.

Here, the process is terminated by powering off or an interruption to abort the process in the flowchart in FIG. 4.

Hereinafter, a specific operation of the information processing system 1 in this embodiment will be described. FIG. 1 is a conceptual diagram of the information processing system 1.

Here, the object shown in FIG. 5 is stored in the first object storage portion 111 of the first information processing apparatus 11. This object is a group of nodes used by an external program (application). The base point (root) of this object is "/". Here, it is assumed that the domain name of the first information processing apparatus 11 is "game_A". Accordingly, it is assumed that, here, the character string "http://game_A" has to be added before the object when an external apparatus (e.g., the second information processing apparatus 12) accesses this object. Furthermore, an "items" node and a "user" node belong in parallel to the level below the base point of this object. The "items" node represents a parent node of items belonging to the level therebelow, and a "lamp" node belongs to that level in the example in FIG. 5. As shown in FIG. 6, nodes representing various state values (data) and logics (application) belong in parallel to the level below the "lamp" node. Furthermore, the "user" node is a parent node for various types of data of users who possess or can use the "items" node, and, in the example in FIG. 5, a "taro" node, a "lamp" node, and a "fuel" node belong to the levels therebelow in this order. Furthermore, a "hanako" node and a "kazuo" node exist in parallel to the "taro" node. The "hanako" node has no node in the level therebelow. Furthermore, the "kazuo" node has a "lamp" node but does not have a "fuel" node in the levels therebelow. Furthermore, in the "fuel" node in the level below the "taro" node, data "25" is stored. The data "25" indicates that "25" of fuel exist, and the data "0" indicates that no fuel exists.

Furthermore, it is assumed that operations to switch this "lamp" on and off have a logic, and the logic is provided that the fuel is gradually reduced when the lamp is lit.

Here, the base point is provided according to a protocol name for exchanging content, and a domain name (and a storage position) representing a computer or the position in the computer in which the content is stored (disposed). In this embodiment, a URI (uniform resource identifier) is used as a label in order to identify content. For example, in the case where an HTTP protocol is used as a communication protocol and a domain name indicating a server in which content is disposed is "game_A", "http://game_A" is obtained. Since the "lamp" content is set to belong to this, "/" is provided for the base point. That is to say, in consideration only of the "lamp" content, the base point is represented as "/". If a protocol name and a domain name (and a storage position, if necessary) are provided before the base point "/", the "lamp" content (lamp object) can be represented by a unique address.

Furthermore, it is assumed that the second non-existence case process information storage portion 121 of the second information processing apparatus 12 holds a non-existence case process information management table shown in FIG. 7. The non-existence case process information management table holds one or more records having an "ID", a "non-existing node identifier", and a "non-existence case process identifier". The "ID" is an attribute for identifying a record. The "non-existing node identifier" indicates information for identifying a node that does not exist. Here, a node is a hierarchical node, and may also be referred to as an object. Furthermore, "*" of the "non-existing node identifier" is a character string consisting of one or more characters. The "non-existence case process identifier" is a process identifier for identifying a process that is executed in the case where a node (object) specified with the "non-existing node identifier" does not exist. The non-existence case process identifier may be one process identifier, or may be two or more process identifiers. In FIG. 7, "install(lamp,/user/*/)" is a process identifier for executing a process that installs a "lamp" application to a node indicated with "/user/*/", and "buy_fuel(50)" is a process identifier for executing a process that buys "50" of fuel. If "buy_fuel(50)" is executed, for example, a process is executed that writes fuel "50" to " . . . /fuel" and reduces (updates) data "deposit amount" of an unshown node. Furthermore, "light(/user/*/lamp/)" indicates a process that lights a lamp. If a lamp is lit by executing "light(/user/*/lamp/)", the numerical value of the corresponding fuel is reduced.

In this situation, three specific examples will be described below.

Specific Example 1

Specific Example 1 is an example of the case in which an object (having application and data) designated by a user of the second information processing apparatus 12 exists in the first information processing apparatus 11.

First, it is assumed that a user (taro) of the second information processing apparatus 12 gives an instruction to execute "/user/taro/lamp" to the second information processing apparatus 12 in order to light his lamp.

Next, the second accepting portion 122 of the second information processing apparatus 12 accepts "/user/taro/lamp".

Then, the second instruction transmitting portion 123 transmits the accepted instruction "/user/taro/lamp" to the first information processing apparatus 11.

Next, the first instruction receiving portion 112 receives the object instruction "/user/taro/lamp" from the second information processing apparatus 12.

Then, the first object non-existence information acquiring portion 113 acquires the object identifier "/user/taro/lamp" contained in the received object instruction "/user/taro/lamp".

Next, the first object non-existence information acquiring portion 113 searches the first object storage portion 111 using, as a key, the acquired object identifier "/user/taro/lamp". Here, an object corresponding to the object identifier "/user/taro/lamp" exists, and, thus, the first processing portion 114 executes a process corresponding to the received object instruction (a process that lights Taro's lamp by executing "/user/taro/lamp").

Then, the first processing portion 114 substitutes a result of the process (lit lamp) for the result information. Next, the first transmitting portion 115 transmits the result information to the second information processing apparatus 12.

Next, the second receiving portion 124 receives the result information (Taro's lamp that has been lit) from the first information processing apparatus 11.

Next, the second output portion 126 outputs the received result information (Taro's lamp that has been lit). Here, "Taro's lamp that has been lit" is, for example, a moving image.

Specific Example 2

Specific Example 2 is an example of the case in which a process identified with the non-existence case process identifier is executed in the case where an object (application, in this example) designated by a user of the second information processing apparatus 12 does not exist in the first information processing apparatus 11.

First, it is assumed that a user (hanako) of the second information processing apparatus 12 gives an instruction to execute "/user/hanako/lamp" to the second information processing apparatus 12 in order to light her lamp.

Next, the second accepting portion 122 of the second information processing apparatus 12 accepts "/user/hanako/lamp".

Then, the second instruction transmitting portion 123 transmits the accepted instruction "/user/hanako/lamp" to the first information processing apparatus 11.

Next, the first instruction receiving portion 112 receives the object instruction "/user/hanako/lamp" from the second information processing apparatus 12.

Then, the first object non-existence information acquiring portion 113 acquires the object identifier "/user/hanako/lamp" contained in the received object instruction "/user/hanako/lamp".

Next, the first object non-existence information acquiring portion 113 searches the first object storage portion 111 using, as a key, the acquired object identifier "/user/hanako/lamp". Here, an object corresponding to the object identifier "/user/hanako/lamp" does not exist, and, thus, the first object non-existence information acquiring portion 113 substitutes information to the effect that the object does not exist (e.g., "−1") for the result information.

Next, the first transmitting portion 115 transmits the result information (e.g., "−1") to the effect that the object does not exist to the second information processing apparatus 12.

Next, the second receiving portion 124 receives the result information (e.g., "−1") from the first information processing apparatus 11.

Next, the second processing portion 125 judges that the received result information (e.g., "−1") is information to the effect that the object does not exist.

Next, the second processing portion 125 acquires the non-existence case process identifier corresponding to the object identifier "/user/hanako/lamp" contained in the object instruction from the non-existence case process information management table in FIG. 7. That is to say, the second processing portion 125 acquires "install(lamp,/user/*/); buy_fuel(50); light(/user/*/lamp);", and substitutes "hanako", which is part of the corresponding object identifier "/user/hanako/lamp", for "*". Then, the second processing portion 125 obtains "install(lamp,/user/hanako/); buy_fuel(50); light(/user/hanako/lamp);".

Then, the second processing portion 125 executes the process "install(lamp,/user/hanako/); buy_fuel(50); light(/user/hanako/lamp);" corresponding to the acquired non-existence case process identifier.

As a result of executing "install(lamp,/user/hanako/)", a node "lamp" is added to the level below the object "/user/hanako".

Furthermore, as a result of executing "buy_fuel(50)", a node "fuel" is added to the level below the object "/user/hanako/lamp", and data "50" is written to the object "/user/hanako/lamp/fuel".

Moreover, as a result of executing "light(/user/hanako/lamp)", Hanako's lamp is lit. That is to say, Hanako's lamp is lit, for example, in a moving image on a display screen of the second information processing apparatus 12.

Specific Example 3

Specific Example 3 is an example of the case in which a process identified with the non-existence case process identifier is executed in the case where an object (data, in this example) designated by a user of the second information processing apparatus 12 does not exist in the first information processing apparatus 11.

First, it is assumed that a user (kazuo) of the second information processing apparatus 12 gives an instruction to execute "check /user/kazuo/lamp/fuel" to the second information processing apparatus 12 in order to light his lamp. The "check /user/kazuo/lamp/fuel" is an instruction to check existence of "/user/kazuo/lamp/fuel".

Next, the second accepting portion 122 of the second information processing apparatus 12 accepts "check /user/kazuo/lamp/fuel".

Then, the second instruction transmitting portion 123 transmits the accepted instruction "check /user/kazuo/lamp/fuel" to the first information processing apparatus 11.

Next, the first instruction receiving portion 112 receives the object instruction "check /user/kazuo/lamp/fuel" from the second information processing apparatus 12.

Then, the first object non-existence information acquiring portion 113 acquires the object identifier "/user/kazuo/lamp/fuel" contained in the received object instruction "check /user/kazuo/lamp/fuel".

Next, the first object non-existence information acquiring portion 113 searches the first object storage portion 111 using, as a key, the acquired object identifier "/user/kazuo/lamp/fuel". Here, an object corresponding to the object identifier "/user/kazuo/lamp/fuel" does not exist, and, thus, the first object non-existence information acquiring portion 113 substitutes information to the effect that the object does not exist (e.g., "−1") for the result information.

Next, the first transmitting portion 115 transmits the result information (e.g., "−1") to the effect that the object does not exist to the second information processing apparatus 12.

Next, the second receiving portion 124 receives the result information (e.g., "−1") from the first information processing apparatus 11.

Next, the second processing portion 125 judges that the received result information (e.g., "−1") is information to the effect that the object does not exist.

Next, the second processing portion 125 acquires the non-existence case process identifier corresponding to the object identifier "/user/kazuo/lamp/fuel" contained in the object instruction from the non-existence case process information management table in FIG. 7. That is to say, the second processing portion 125 acquires "buy_fuel(50); light(/user/*/lamp);", and substitutes "kazuo", which is part of the corresponding object identifier "/user/kazuo/lamp/fuel", for "*". Then, the second processing portion 125 obtains "buy_fuel(50); light(/user/kazuo/lamp);".

Then, the second processing portion 125 executes the process "buy_fuel(50); light(/user/kazuo/lamp);" corresponding to the acquired non-existence case process identifier.

As a result of executing "buy_fuel(50)", a node "fuel" is added to the level below the object "/user/kazuo/lamp", and data "50" is written to the object "/user/hanako/lamp/fuel".

Moreover, as a result of executing "light(/user/kazuo/lamp)", Kazuo's lamp is lit. That is to say, Kazuo's lamp is lit, for example, in a moving image on a display screen of the second information processing apparatus 12.

As described above, according to this embodiment, it is possible to provide an information processing system including: a first information processing apparatus 11 in which an object having hierarchical nodes is stored; and a second information processing apparatus 12 that executes a process using the object; wherein the second information processing apparatus 12 acquires information indicating existence or non-existence of an object, and executes different processes depending on the existence or non-existence.

This sort of information processing system provides the following effect. That is to say, even in the case where one or more applications are developed in a distributed manner between one or more information processing apparatuses on a network by multiple programmers, users, or the like, and an object (application or data) existing in one or more information processing apparatuses is changed or added as needed, an application that operates without causing an error can be obtained.

Here, according to the specific examples of this embodiment, the non-existing node identifier and the non-existence case process identifier are stored in the table shown in FIG. 7. However, there is no limitation on the method for managing the non-existing node identifier, the non-existence case process identifier, and the like. That is to say, for example, the non-existing node identifier and the non-existence case process identifier may also be embedded in a program stored in the second non-existence case process information storage portion 121 of the second information processing apparatus 12 as shown in FIG. 8.

FIG. 8 shows a program for lighting lamps of all users (taro, hanako, kazuo, etc.). In FIG. 8, "For(all_users)" is a loop that executes a process on resources of all users (that lights lamps). Furthermore, "IF "http://game_A/user/*/lamp" IS NOT EXIST" indicates the condition that "if the application "http://game_A/user/*/lamp" does not exist". Then, if this condition is satisfied, the process identified with the non-existence case process identifier enclosed by "{" and "}" is executed.

Furthermore, in FIG. 8, "IF "http://game_A/user/*/lamp/fuel" IS NOT EXIST" indicates the condition that "if the data "http://game_A/user/*/lamp/fuel" does not exist". Then, if this condition is satisfied, the process identified with the non-existence case process identifier enclosed by "{" and "}" is executed.

Furthermore, in FIG. 8, "IF "http://game_A/user/*/lamp/fuel"=0" indicates the condition that "if the data "http://game_A/user/*/lamp/fuel" is "0"". Then, if this condition is satisfied, the process identified with the process identifier enclosed by "{" and "}" is executed.

Moreover, in FIG. 8, "ELSE" indicates the condition that none of the three conditions is satisfied. Then, if this condition is satisfied, the process identified with the process identifier enclosed by "{" and "}" is executed.

Moreover, the process in this embodiment may be realized using software. The software may be distributed by software download or the like. Furthermore, the software may be distributed in a form where the software is stored in a storage medium, such as a CD-ROM. Furthermore, it will be appreciated that this software or a storage medium in which this software is stored may be distributed as a computer program product. Note that the same is applied to other embodiments described in this specification. The software that realizes the first information processing apparatus in this embodiment may be the following sort of program. Specifically, this program is a program for causing a computer, in which at least one object having at least one data node and at least one application node that are hierarchical is stored in a storage medium, to function as: a first instruction receiving portion that receives an object instruction, which is an instruction having an object identifier for identifying an object and is an instruction for the object, from a second information processing apparatus; a first object non-existence information acquiring portion that acquires information to an effect that the object identified with the object identifier contained in the object instruction does not exist, in a case where the object does not exist; a first processing portion that processes the object identified with the object identifier contained in the object instruction according to the object instruction, in a case where the object exists; and a first transmitting portion that transmits result information, which is information acquired by the first object non-existence information acquiring portion or information on a result of the process executed by the first processing portion, to the second information processing apparatus.

Furthermore, the software that realizes the second information processing apparatus may be the following sort of program. Specifically, this program is a program for causing a computer, in which a pair of an object identifier and a non-existence case process identifier for identifying a process that is executed in a case where an object identified with the object identifier does not exist are stored in a storage medium, to function as: a second receiving portion that receives result information transmitted by a first information processing apparatus; a second processing portion that executes the process identified with the non-existence case process identifier corresponding to the object identifier of the object, in a case where the result information received by the second receiving portion is information to an effect that the object does not exist; and a second output portion that outputs the result information received by the second receiving portion, in a case where the result information is not information to an effect that the object does not exist.

Embodiment 2

In this embodiment, an information processing system will be described that is provided with a first information processing apparatus in which an object having at least one data node and at least one application node that are hierarchical is stored, and a second information processing apparatus that executes a process using the object. Furthermore, the second information processing apparatus acquires the structure of the object. Moreover, the first information processing apparatus executes different processes depending on the structure.

Figure 9:
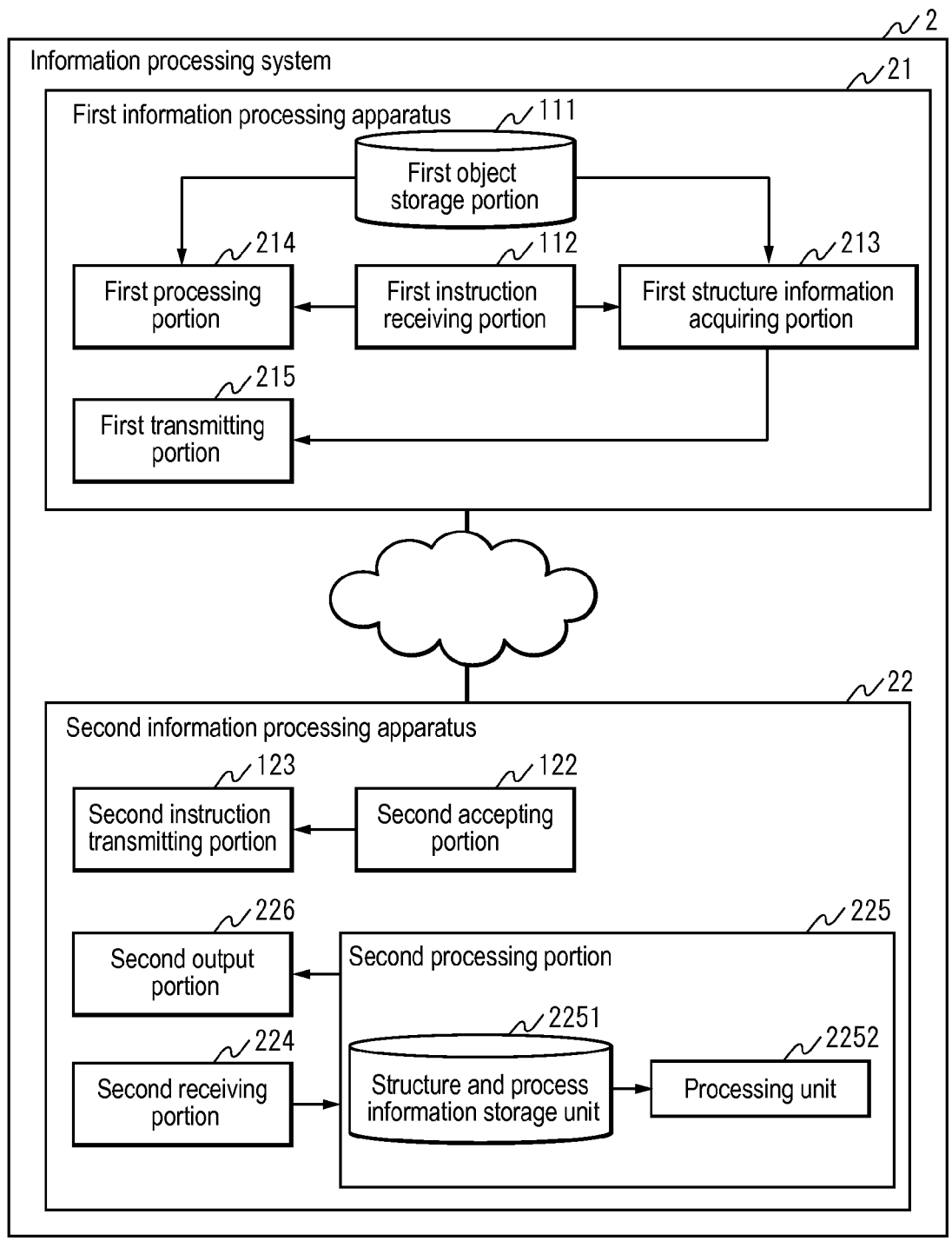
FIG. 9 is a block diagram of an information processing system in Embodiment 2.

A conceptual diagram of an information processing system 2 in this embodiment is similar to that in FIG. 1. FIG. 9 is a block diagram of the information processing system 2 in this embodiment.

The information processing system 2 is provided with first information processing apparatuses 21 and second information processing apparatuses 22.

The first information processing apparatus 21 is provided with the first object storage portion 111, the first instruction receiving portion 112, a first structure information acquiring portion 213, a first processing portion 214, and a first transmitting portion 215.

The second information processing apparatus 22 is provided with the second accepting portion 122, the second instruction transmitting portion 123, a second receiving portion 224, a second processing portion 225, and a second output portion 226.

The second processing portion 225 is provided with a structure and process information storage unit 2251 and a processing unit 2252.

The first structure information acquiring portion 213 acquires an object or structure information. The structure information is information relating to the structure of an object. The structure information is, for example, information on the hierarchy depth of an object, the number of nodes in an object, the maximum number of horizontal nodes (sibling nodes) in a level of an object, the larger one of the hierarchy depth of an object and the maximum number of horizontal nodes in a level of the object, or the like. The object acquired by the first structure information acquiring portion 213 is the object identified with the object identifier contained in the object instruction received by the first instruction receiving portion 112. Here, in the case where the first structure information acquiring portion 213 acquires an object, the second information processing apparatus 22 acquires the structure information of the object. Furthermore, the structure information acquired by the first structure information acquiring portion 213 is information relating to the structure of the object identified with the object identifier contained in the object instruction received by the first instruction receiving portion 112. The first structure information acquiring portion 213 can be realized typically as an MPU, a memory, or the like. Typically, the processing procedure of the first structure information acquiring portion 213 is realized by software, and the software is stored in a storage medium such as a ROM. Note that the processing procedure may be realized also by hardware (a dedicated circuit).

The first processing portion 214 executes various processes. The various processes may be any process. The first processing portion 214 holds, for example, programs, modules, electronic circuits, and the like corresponding to various processes. The first processing portion 214 can be realized typically as an MPU, a memory, or the like. Typically, the processing procedure of the first processing portion 214 is realized by software, and the software is stored in a storage medium such as a ROM. Note that the processing procedure may be realized also by hardware (a dedicated circuit).

The first transmitting portion 215 transmits the object or the structure information acquired by the first structure information acquiring portion 213 to the second information processing apparatus 22. The first transmitting portion 215 is realized typically as a wireless or wired communication unit, but may also be realized as a broadcasting unit.

The second receiving portion 224 receives the object or the structure information transmitted by the first information processing apparatus 21. The second receiving portion 224 is realized typically as a wireless or wired communication unit, but may also be realized as a unit that receives a broadcast.

The second processing portion 225 executes different processes depending on structure information acquired from the object received by the second receiving portion 224 or the structure information received by the second receiving portion 224. Here, there is no limitation on the content of the different processes. The second processing portion 225 executes different processes depending on the hierarchy depth, and for example, executes a process A (e.g., that sequentially processes nodes) on an object having a depth of one level, and executes a process B (e.g., that executes recursive processes) on an object having a depth of two or more levels. Furthermore, for example, a process executed by the second processing portion 225 on an object having one level, a process executed on an object having two levels, and a process executed on an object having three or more levels are preferably different from one another. For example, the second processing portion 225 executes a game that designs and outputs a house according to the family structure, and automatically designs and outputs a single-family house in the case where an object (family) for which a house is constructed has one level (one family). Furthermore, for example, the second processing portion 225 automatically designs and outputs a two-family house (having two front doors, two kitchens, etc.) in the case where an object (family) for which a house is constructed has two levels (two families). The second processing portion 225 can be realized typically as an MPU, a memory, or the like. Typically, the processing procedure of the second processing portion 225 is realized by software, and the software is stored in a storage medium such as a ROM. Note that the processing procedure may be realized also by hardware (a dedicated circuit).

In the structure and process information storage unit 2251, two or more pieces of structure and process information are stored. The structure and process information has a pair of structure information of an object (e.g., the depth of the hierarchical structure) and a process identifier for identifying a process. Here, the depth of the hierarchical structure is typically a numerical value. Furthermore, the process identifier is a method name, a function name, a message name, an execution module name, or the like. The process identifier may also be embedded in a program. The structure and process information storage unit 2251 is preferably a non-volatile storage medium, but may also be realized as a volatile storage medium. There is no limitation on the procedure in which the structure and process information is stored in the structure and process information storage unit 2251. For example, the structure and process information may be stored in the structure and process information storage unit 2251 via a storage medium, the structure and process information transmitted via a communication line or the like may be stored in the structure and process information storage unit 2251, or the structure and process information input via an input device may be stored in the structure and process information storage unit 2251.

The processing unit 2252 executes a process identified with the process identifier corresponding to the structure information. The processing unit 2252 can be realized typically as an MPU, a memory, or the like. Typically, the processing procedure of the processing unit 2252 is realized by software, and the software is stored in a storage medium such as a ROM. Note that the processing procedure may be realized also by hardware (a dedicated circuit).

The second output portion 226 outputs a result of the process executed by the second processing portion 225. There is no limitation on the content, the data structure, and the like of the result of the process. The second output portion 226 may be considered to include or not to include an output device, such as a display screen or a loudspeaker. The second output portion 226 may be realized as driver software for an output device, or a combination of driver software for an output device and the output device.

Next, an operation of the information processing system 2 will be described. First, an operation of the first information processing apparatus 21 will be described with reference to the flowchart in FIG. 10.

(Step S1001) The first instruction receiving portion 112 judges whether or not the object instruction has been received from the second information processing apparatus 22. If the object instruction has been received, the procedure advances to step S1002. If the object instruction has not been received, the procedure returns to step S1001.

(Step S1002) The first structure information acquiring portion 213 judges whether the object instruction received in step S1001 is an instruction to execute a process that acquires the structure of an object, or an instruction relating to the structure of the object (this instruction is referred to as a "structure relating instruction"). Here, in the first structure information acquiring portion 213, one or more process identifiers corresponding to the structure relating instruction are typically stored. Then, the first structure information acquiring portion 213 judges whether or not the object instruction contains any structure relating instruction.

(Step S1003) The first structure information acquiring portion 213 acquires the object identifier from the object instruction received in step S1001.

(Step S1004) The first structure information acquiring portion 213 acquires an object or structure information from the object identifier acquired in step S1003. The structure information is information on the structure of an object identified with the object identifier. Here, for example, the object identifier is a URI, and the first structure information acquiring portion 213 acquires the hierarchy depth from the URI. Furthermore, the hierarchy depth is an example of the structure information. Here, this sort of process is a known art.

(Step S1005) The first processing portion 214 executes an operation corresponding to the object instruction received in step S1001.

(Step S1006) The first transmitting portion 215 transmits a result of the process (result information). The result information is the object or the structure information acquired in step S1004, or a result of the process that is executed in step S1005. The procedure returns to step S1001.

Figure 10:
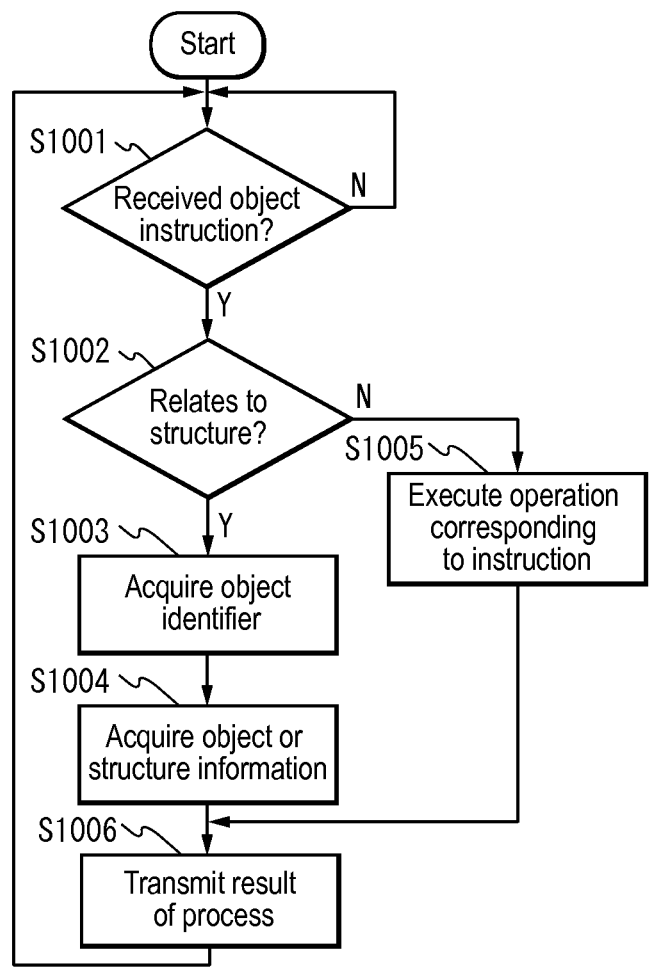
FIG. 10 is a flowchart illustrating an operation of a first information processing apparatus of this embodiment.

Here, the process is terminated by powering off or an interruption to abort the process in the flowchart in FIG. 10.

Next, an operation of the second information processing apparatus 22 will be described with reference to the flowchart in FIG. 11. In the flowchart in FIG. 11, a description of the same steps as those in the flowchart in FIG. 4 has been omitted.

(Step S1101) The second processing portion 225 judges whether or not the result information received in step S403 is information relating to the structure. If the result information is information relating to the structure, the procedure advances to step S1102. If the result information is not information relating to the structure, the procedure advances to step S406. Here, the second processing portion 225 may judge whether or not the transmitted instruction is an instruction relating to the structure.

(Step S1102) The second processing portion 225 judges whether the result information received in step S403 is the structure information or the object. If the result information is the structure information, the procedure advances to step S1104. If the result information is the object, the procedure advances to step S1103.

(Step S1103) The processing unit 2252 of the second processing portion 225 acquires the structure information from the object.

(Step S1104) The processing unit 2252 acquires the process identifier corresponding to the structure information from the structure and process information storage unit 2251.

(Step S1105) The processing unit 2252 executes the process identified with the process identifier acquired in step S1104. The procedure returns to step S401.

Figure 11:
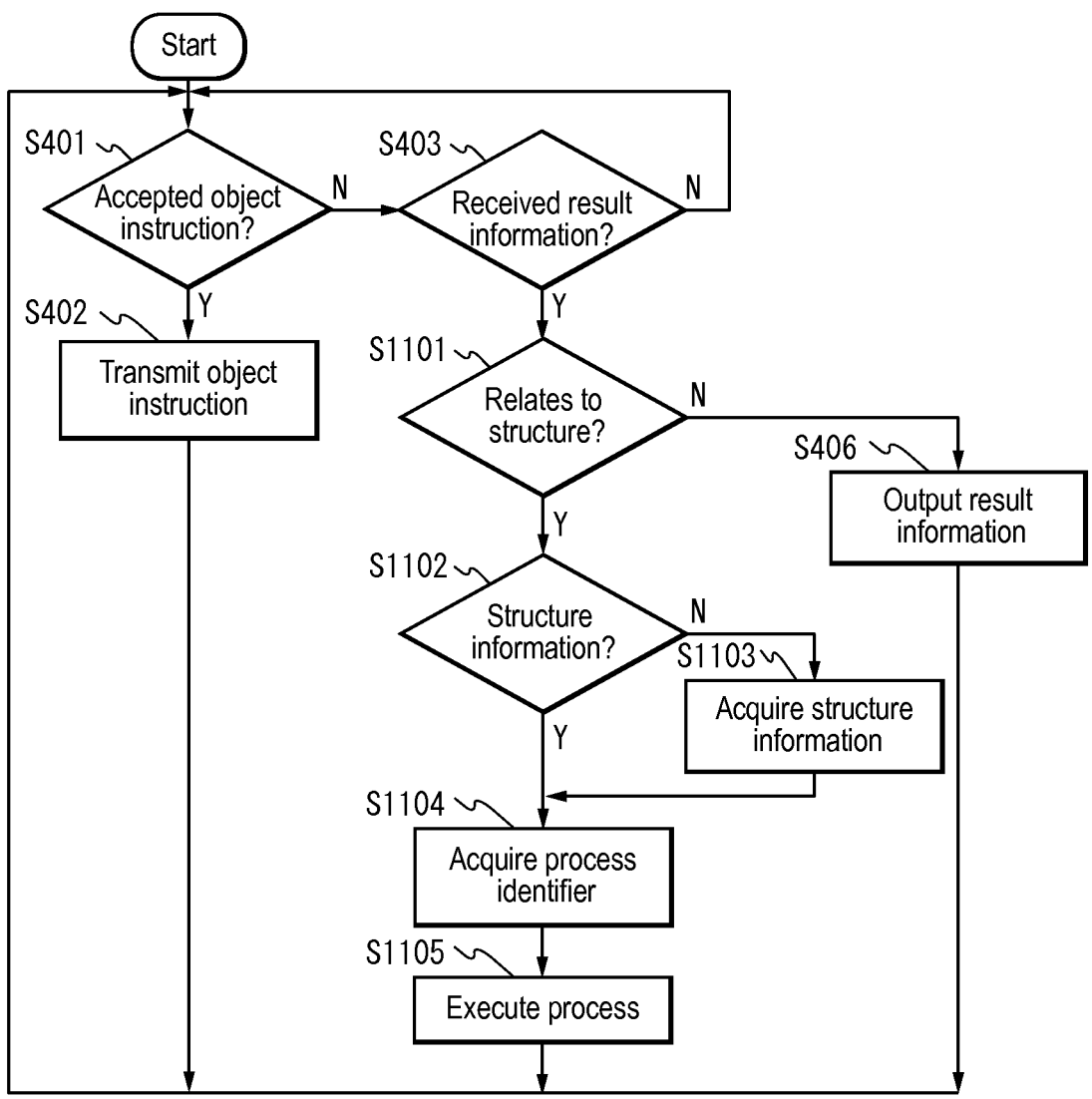
FIG. 11 is a flowchart illustrating an operation of a second information processing apparatus of this embodiment.

Here, the process is terminated by powering off or an interruption to abort the process in the flowchart in FIG. 11.

Hereinafter, a specific operation of the information processing system 2 in this embodiment will be described. A conceptual diagram of the information processing system 2 is similar to that in FIG. 1.

Here, the object shown in FIG. 12 is stored in the first object storage portion 111 of the first information processing apparatus 21. This object is a group of nodes used by an external program (application), and has a similar structure to that of the object in FIG. 5. The object shown in FIG. 12 indicates the family structure of each user, and is a group of hierarchical data nodes or the like. Here, it will be appreciated that the object shown in FIG. 12 may have an application node. Here, it is assumed that the domain name of the first information processing apparatus 21 is "game_A". Then, the first information processing apparatus 21 can be accessed with "http://game_A".

Furthermore, in the object shown in FIG. 12, the "taro" node has no child node. Furthermore, the "hanako" node has two child nodes. Furthermore, the child node "hchild2" of the "hanako" node has one child node (a grandchild node when viewed from the "hanako" node). Moreover, the "kazuo" node has two child nodes, and has no grandchild node.

Furthermore, the structure and process information storage unit 2251 of the second information processing apparatus 22 holds a structure and process information management table shown in FIG. 13. The structure and process information management table has attributes of "ID", "hierarchy level", and "process identifier". The "hierarchy level" indicates the hierarchy depth. The process identifier is information for identifying a process that is executed in the case where the hierarchy level is determined. The process identifier in this example is a function name (it may also be a method name, a message name, or the like). In FIG. 13, a function identified with the process identifier "create_1st_house" indicates a process that defines a house that is a single-story house and is a single-family house. A function identified with the process identifier "create_2nd_house" indicates a process that defines a house that is a two-story house and is a two-family house. A function identified with the process identifier "create_3rd_house" indicates a process that defines a house that is a three-story house and is a three-family house.

In this situation, it is assumed that a user of the second information processing apparatus 22 inputs an object instruction "Create_house http://game_A/user/taro".

Then, the second accepting portion 122 accepts the object instruction "Create_house http://game_A/user/taro".

Next, the second instruction transmitting portion 123 transmits the object instruction "Create_house http://game_A/user/taro" to the first information processing apparatus 21. Here, the second instruction transmitting portion 123 may transmit the object instruction "Create_house /user/taro" to the first information processing apparatus 21.

Next, the first instruction receiving portion 112 of the first information processing apparatus 21 receives "Create_house http://game_A/user/taro".

Then, it is assumed that the first structure information acquiring portion 213 extracts the command "Create_house" contained in the object instruction "Create_house http://game_A/user/taro", and judges that the object instruction is an instruction to execute a process that acquires the structure of an object. Here, it is assumed that, in the first structure information acquiring portion 213, one or more process identifiers "Create_house,Get_nest_level, . . . " corresponding to one or more structure relating instructions for identifying a command to execute a process that acquires the structure of the object are stored in advance. Then, the first structure information acquiring portion 213 judges whether or not a command contained in the object instruction received by the first instruction receiving portion 112 is contained among the identifiers corresponding to one or more structure relating instructions stored in advance. Then, since "Create_house" is contained among the held identifiers, the first structure information acquiring portion 213 judges that the object instruction "Create_house http://game_A/user/taro" is an instruction to execute a process that acquires the structure of an object.

Next, the first structure information acquiring portion 213 acquires the object identifier "/user/taro" from the received object instruction "Create_house http://game_A/user/taro". Here, the object identifier is obtained by excluding information for identifying the protocol "http" and the domain name "game_A" from "http://game_A/user/taro", but these may be considered to be included in the object identifier.

Next, the first structure information acquiring portion 213 acquires the hierarchy depth "1" of an object containing descendant nodes of the acquired object identifier "/user/taro" from the object identifier. Here, it is assumed that, if there is no descendant node, the structure information is "1".

Next, the first processing portion 214 acquires the process identifier "create__1st_house" corresponding to the structure information "1" from the structure and process information management table shown in FIG. 13. Then, the first processing portion 214 executes a process corresponding to the process identifier "create__1st_house". That is to say, the first processing portion 214 executes the process "create__1st_house(/user/taro)". Then, Taro's house (single-family house) is designed. Here, designing of a house is, for example, writing of data of the house to a database.

Next, the first transmitting portion 215 transmits a result of the process (information on Taro's house (e.g., plans of the house, etc.)) to the second information processing apparatus 22.

Next, the second receiving portion 224 of the second information processing apparatus 22 receives the result of the process (information on Taro's house (e.g., plans of the house, etc.)). Then, the second output portion 226 outputs the result of the process.

Furthermore, next, it is assumed that a user of the second information processing apparatus 22 inputs an object instruction "Create_house http://game_A/user/hanako".

Then, the second accepting portion 122 accepts the object instruction "Create_house http://game_A/user/hanako".

Next, the second instruction transmitting portion 123 transmits the object instruction "Create_house http://game_A/user/hanako" to the first information processing apparatus 21.

Next, the first instruction receiving portion 112 of the first information processing apparatus 21 receives "Create_house http://game_A/user/hanako".

Then, it is assumed that the first structure information acquiring portion 213 extracts the command "Create_house" contained in the object instruction "Create_house http://game_A/user/hanako", and judges that the object instruction is an instruction to execute a process that acquires the structure of an object.

Next, the first structure information acquiring portion 213 acquires the object identifier "/user/hanako" from the received object instruction "Create_house http://game_A/user/hanako".

Next, the first structure information acquiring portion 213 acquires the hierarchy depth "3" of an object containing descendant nodes of the acquired object identifier "/user/hanako" from the object identifier. Since the lowest-level node of the object identifier "/user/hanako" is "/user/hanako/hchild2/hgch1", and is in the level lower than that of the node "/user/hanako" by two levels, the first structure information acquiring portion 213 acquires the hierarchy depth "3".

Next, the first processing portion 214 acquires the process identifier "create__3rd_house" corresponding to the structure information "3" from the structure and process information management table shown in FIG. 13. Then, the first processing portion 214 executes a process corresponding to the process identifier "create__3rd_house". That is to say, the first processing portion 214 executes the process "create__3rd_house(/user/hanako)". Then, Hanako's house (three-family house) is designed.

Next, the first transmitting portion 215 transmits the result information (information on Hanako's house) to the second information processing apparatus 22.

Next, the second receiving portion 224 of the second information processing apparatus 22 receives the result information. Then, the second output portion 226 outputs the result information.

As described above, according to this embodiment, in the case where some sort of operation is executed using an object stored in a remote apparatus, different operations can be executed depending on the structure of the object. Accordingly, a process can be executed utilizing characteristics of a hierarchical object (a group of application nodes and data nodes). Furthermore, since different operations can be executed depending on the structure of the object, so-called metaprogramming can be easily executed.

Here, according to the specific examples of this embodiment, the structure and process information storage unit 2251 holds the structure and process information in a table structure. However, there is no limitation on the structure of the structure and process information. The structure and process information may be, for example, embedded in a program. FIG. 14 shows an example of this sort of program. In FIG. 14, "GET_nest_level(http://game_A/user/Person)" is an object instruction to acquire the structure information (hierarchy depth) of the argument node in ( ) and nodes therebelow. Furthermore, "Person" in "GET_nest_level(http://game_A/user/Person)" is a variable, and, for example, "taro" or "hanako" is substituted therefor. Furthermore, in FIG. 14, in the case of the structure information "1", "create__1st_house (http://game_A/user/Person)" is executed. Here, "create__1st_house(http://game_A/user/Person)" indicates a process that designs a house (single-family house) in consideration of the structure of the node identified with "Person" and nodes therebelow.

Furthermore, according to the specific examples of this embodiment, the structure information is the hierarchy depth. However, as described above, the structure information may also be other information relating to the structure of the object. That is to say, the second processing portion 225 need only be able to execute different processes depending on the structure information. For example, the second processing portion 225 may execute a process prioritizing the width (there is no limitation on the content of the process) if the number of sibling nodes of the object contained in the object instruction is larger than the hierarchy depth, and may execute a process prioritizing the depth if the number of sibling nodes is smaller than the hierarchy depth. In this case, the structure information is information on which is larger or smaller of the number of sibling nodes of an object and the hierarchy depth of the object.

Moreover, the software that realizes the first information processing apparatus in this embodiment may be the following sort of program. Specifically, this program is a program for causing a computer, in which at least one object having at least one data node and at least one application node that are hierarchical is stored in a storage medium, to function as: a first instruction receiving portion that receives an object instruction, which is an instruction having an object identifier for identifying an object and is an instruction for the object, from a second information processing apparatus; a first structure information acquiring portion that acquires the object identified with the object identifier contained in the object instruction or structure information, which is information relating to a structure of the object identified with the object identifier contained in the object instruction; and a first transmitting portion that transmits the object or the structure information acquired by the first structure information acquiring portion to the second information processing apparatus.

Furthermore, the software that realizes the second information processing apparatus may be the following sort of program. Specifically, this program is a program for causing a computer to function as: a second receiving portion that receives an object or structure information transmitted by a first information processing apparatus; a second processing portion that executes different processes depending on structure information acquired from the object received by the second receiving portion, or the structure information received by the second receiving portion; and a second output portion that outputs a result of the process executed by the second processing portion.

Embodiment 3

In this embodiment, an information processing system will be described that has not only the first information processing apparatus in which an object wherein nodes are hierarchical is stored and the second information processing apparatus that executes a process using the object but also a third information processing apparatus, wherein a link can be provided from an object of the first information processing apparatus to an object of the third information processing apparatus. In this embodiment, a method for processing one object in the case where one object is a link object including a link to an object of another apparatus will be described. Here, another object processing method for a link object will be described in Embodiment 4.

Figure 15:
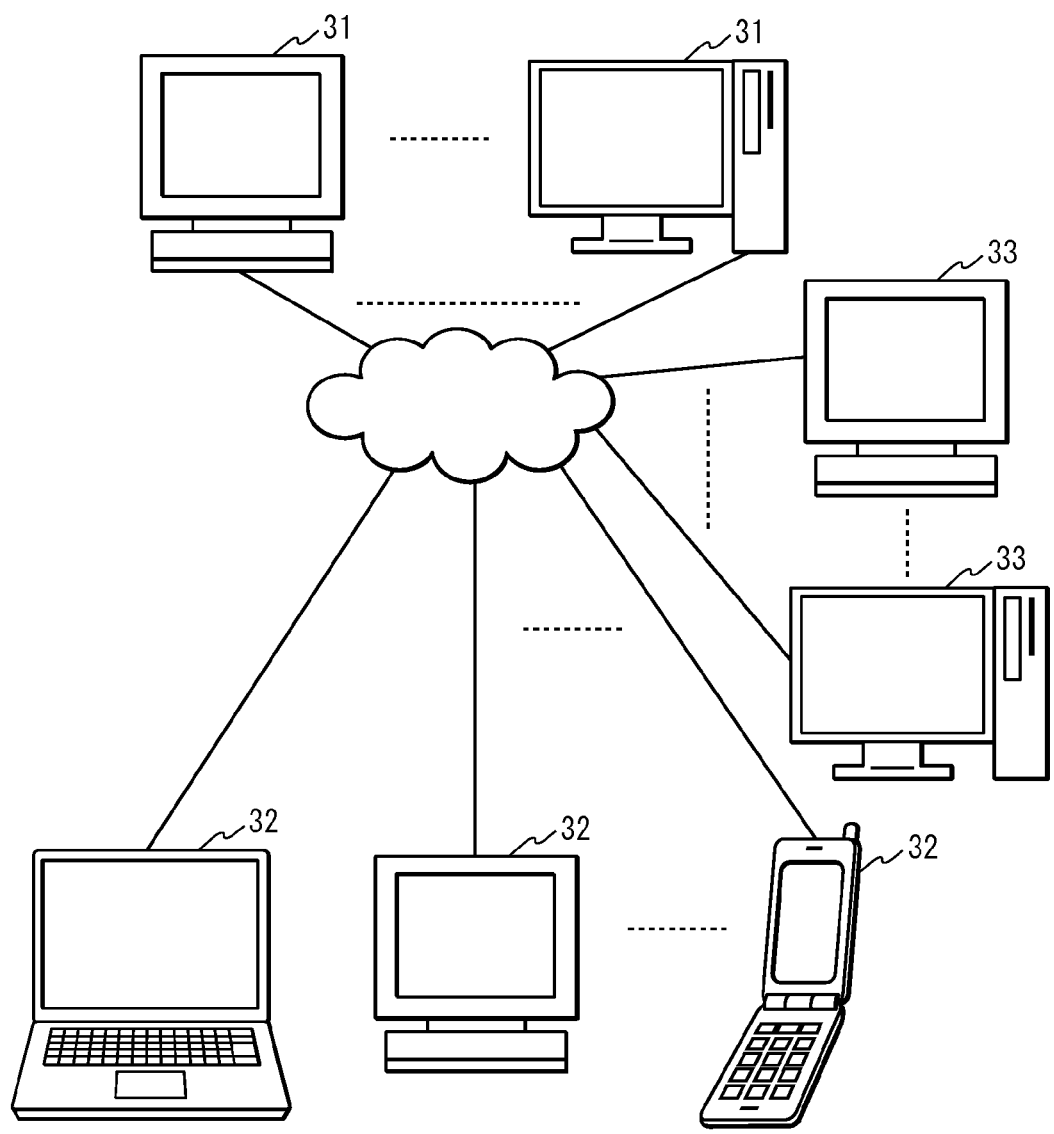
FIG. 15 is a conceptual diagram of an information processing system 3 in Embodiment 3.

FIG. 15 is a conceptual diagram of an information processing system 3 in this embodiment. The information processing system 3 is provided with first information processing apparatuses 31, second information processing apparatuses 32, and third information processing apparatuses 33.

Figure 16:
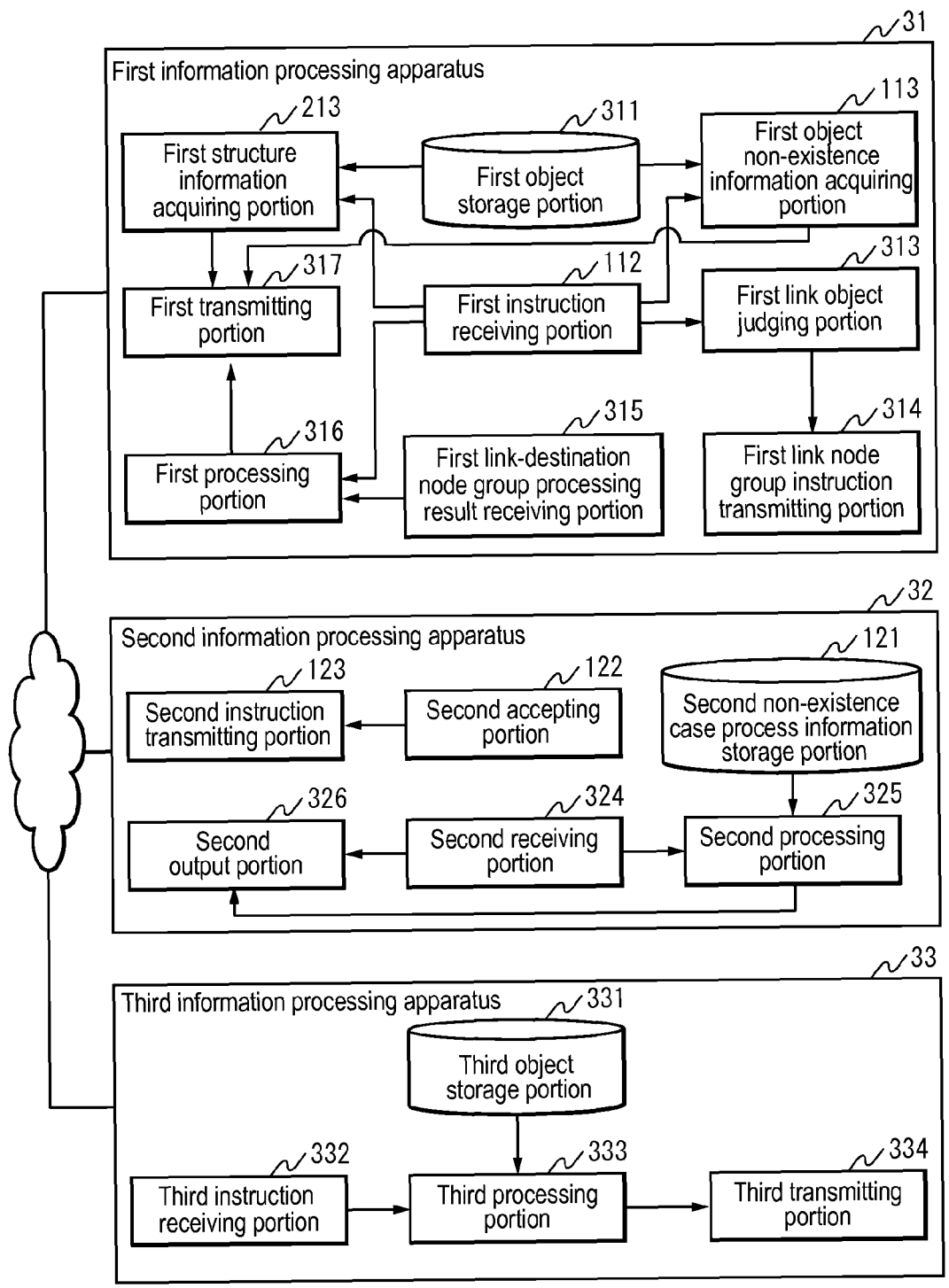
FIG. 16 is a block diagram of an information processing system of this embodiment.

FIG. 16 is a block diagram of the information processing system 3 in this embodiment. The first information processing apparatus 31 is provided with a first object storage portion 311, the first instruction receiving portion 112, a first link object judging portion 313, a first link node group instruction transmitting portion 314, a first link-destination node group processing result receiving portion 315, a first processing portion 316, a first transmitting portion 317, the first object non-existence information acquiring portion 113, and the first structure information acquiring portion 213.

The second information processing apparatus 32 is provided with the second accepting portion 122, the second instruction transmitting portion 123, a second receiving portion 324, a second processing portion 325, a second output portion 326, and the second non-existence case process information storage portion 121.

The second processing portion 325 is provided with the structure and process information storage unit 2251 and the processing unit 2252.

The third information processing apparatus 33 is provided with a third object storage portion 331, a third instruction receiving portion 332, a third processing portion 333, and a third transmitting portion 334.

In the first object storage portion 311, one or more objects can be stored. It is assumed that one or more objects among the objects stored in the first object storage portion 311 are link objects. The link object is an object in which a node group (link node group) as part of the object including a hierarchical node group exists in another apparatus (the third information processing apparatus 33, in this example). Information on the link to the other apparatus is stored in one node of the link object. The first object storage portion 311 is preferably a non-volatile storage medium, but may also be realized as a volatile storage medium. There is no limitation on the procedure in which the object is stored in the first object storage portion 311. For example, the object may be stored in the first object storage portion 311 via a storage medium, the object transmitted via a communication line or the like may be stored in the first object storage portion 311, or the object input via an input device may be stored in the first object storage portion 311.

The first instruction receiving portion 112 receives an link node group instruction. The link node group instruction is an instruction for a link node group. In other words, the link node group instruction is an instruction for a link-destination node, or the link-destination node and a node group therebelow. There is no limitation on the content of the instruction. The instruction is, for example, an instruction to transmit a link node group, an instruction to transmit the existence or the non-existence of a link node group, an instruction to transmit the structure information of a link node group, an instruction to execute a process on (to update, delete, add, etc.) one or more nodes constituting a link node group, or the like. The first instruction receiving portion 112 is realized typically as a wireless or wired communication unit, but may also be realized as a unit that receives a broadcast.

The first link object judging portion 313 judges whether or not an object corresponding to the link node group instruction received by the first instruction receiving portion 112 is the link object. Here, the link object is an object having a node provided with a link to an object stored in the third information processing apparatus 33. In other words, the link object is an object having a link node group. The first link object judging portion 313 can be realized typically as an MPU, a memory, or the like. Typically, the processing procedure of the first link object judging portion 313 is realized by software, and the software is stored in a storage medium such as a ROM. Note that the processing procedure may be realized also by hardware (a dedicated circuit).

In the case where the first link object judging portion 313 judges that the object is the link object, the first link node group instruction transmitting portion 314 transmits the link node group instruction to the third information processing apparatus 33, which is a link-destination apparatus of the link object. The first link node group instruction transmitting portion 314 is realized typically as a wireless or wired communication unit, but may also be realized as a broadcasting unit.

The first link-destination node group processing result receiving portion 315 receives a processing result of the link node group from the third information processing apparatus 33 in response to transmission of the link node group instruction. The processing result may be a result of a process executed on a link node group, may be a link node group, may be information indicating the existence or the non-existence of a link node group, or may be the structure information of a link node group, for example. There is no limitation on the content of the process that provides a processing result. The first link-destination node group processing result receiving portion 315 is realized typically as a wireless or wired communication unit, but may also be realized as a unit that receives a broadcast.

The first processing portion 316 acquires result information, which is the processing result or a result of a process executed according to the processing result. Here, it is assumed that the first processing portion 316 can also execute processes that are executed by the first processing portion 114 and the first processing portion 214. The first processing portion 316 can be realized typically as an MPU, a memory, or the like. Typically, the processing procedure of the first processing portion 316 is realized by software, and the software is stored in a storage medium such as a ROM. Note that the processing procedure may be realized also by hardware (a dedicated circuit).

The first transmitting portion 317 transmits the result information to the second information processing apparatus 32. The first transmitting portion 317 is realized typically as a wireless or wired communication unit, but may also be realized as a broadcasting unit.

The second receiving portion 324 receives the result information transmitted by the first information processing apparatus 31. Furthermore, the second receiving portion 324 receives the object or the structure information transmitted by the first information processing apparatus 31. The second receiving portion 324 is realized typically as a wireless or wired communication unit, but may also be realized as a unit that receives a broadcast.

In the case where the result information received by the second receiving portion 324 is information to the effect that the object does not exist, the second processing portion 325 executes the process identified with the non-existence case process identifier corresponding to the object identifier of the object. Furthermore, the second processing portion 325 executes different processes depending on structure information acquired from the object received by the second receiving portion 324 or the structure information received by the second receiving portion 324. Here, there is no limitation on the content of the different processes. The second processing portion 325 can be realized typically as an MPU, a memory, or the like. Typically, the processing procedure of the second processing portion 325 is realized by software, and the software is stored in a storage medium such as a ROM. Note that the processing procedure may be realized also by hardware (a dedicated circuit).

In the case where the result information received by the second receiving portion 324 is not information to the effect that the object does not exist, the second output portion 326 outputs the result information. Furthermore, the second output portion 326 outputs a result of the process executed by the second processing portion 325. The second output portion 326 may be considered to include or not to include an output device, such as a display screen or a loudspeaker. The second output portion 326 may be realized as driver software for an output device, or a combination of driver software for an output device and the output device.

In the third object storage portion 331, one or more objects can be stored. In the third object storage portion 331, one or more objects having a link from a node of one object of the first object storage portion 311 can be stored. Information indicating that a link from the first information processing apparatus 31 is provided may not exist or may exist in the object of the third object storage portion 331. Furthermore, the link may be directional or may be non-directional. Here, the link is typically directional. The third object storage portion 331 is preferably a non-volatile storage medium, but may also be realized as a volatile storage medium. There is no limitation on the procedure in which the object is stored in the third object storage portion 331. For example, the object may be stored in the third object storage portion 331 via a storage medium, the object transmitted via a communication line or the like may be stored in the third object storage portion 331, or the object input via an input device may be stored in the third object storage portion 331.

The third instruction receiving portion 332 receives the link node group instruction, which is an instruction for a link node group, from the first information processing apparatus 31. The third instruction receiving portion 332 is realized typically as a wireless or wired communication unit, but may also be realized as a unit that receives a broadcast.

The third processing portion 333 executes a process corresponding to the link node group instruction, and acquires a processing result. There is no limitation on the content of the process executed by the third processing portion 333. Furthermore, the third processing portion 333 holds processing modules (that may be realized as execution modules, programs, electronic circuits, or the like) corresponding to one or more types of link node group instructions, and selects and executes a processing module corresponding to the link node group instruction. The third processing portion 333 can be realized typically as an MPU, a memory, or the like. Typically, the processing procedure of the third processing portion 333 is realized by software, and the software is stored in a storage medium such as a ROM. Note that the processing procedure may be realized also by hardware (a dedicated circuit).

The third transmitting portion 334 transmits a processing result of the third processing portion 333 to the first information processing apparatus 31. The third transmitting portion 334 is realized typically as a wireless or wired communication unit, but may also be realized as a broadcasting unit.

Next, an operation of the information processing system 3 will be described. First, an operation of the first information processing apparatus 31 will be described with reference to the flowchart in FIG. 17. In the flowchart in FIG. 17, a description of the same steps as those in the flowchart in FIG. 3 or 10 has been omitted.

(Step S1701) The first link object judging portion 313 judges whether or not the object corresponding to the object instruction received by the first instruction receiving portion 112 is the link object. More specifically, for example, the first link object judging portion 313 executes a process as described below. First, the first link object judging portion 313 acquires the object identifier contained in the object instruction received by the first instruction receiving portion 112. Next, nodes contained in the object identified with the object identifier are sequentially checked from a higher-level node to a lower-level node of the hierarchy, and whether or not a link node is contained in the object is judged. Here, data of the link node, for example, has a protocol name and a domain name as "http://game_B/xxx/yyy". Here, the data of the link node does not necessarily need to have a protocol name and a domain name, and need only have a predetermined data content, data format, and the like of the link node.

(Step S1702) The first link object judging portion 313 causes the procedure to advance to step S1703 if a result of the judgment in step S1701 indicates that the object is the link object, and causes the procedure to advance to step S302 if a result of the judgment indicates that the object is not the link object.

(Step S1703) The first link node group instruction transmitting portion 314 constructs a link node group instruction. The first link node group instruction transmitting portion 314 constructs "GET http://game_B/xxx/yyy", for example, using data of the link node (e.g., "http://game_B/xxx/yyy") and the command identifier (e.g., GET) that is held in advance, and stores it in the memory.

(Step S1704) The first link node group instruction transmitting portion 314 transmits the link node group instruction constructed in step S1703 to the third information processing apparatus 33.

(Step S1705) The first link-destination node group processing result receiving portion 315 judges whether or not a processing result of the link node group has been received from the third information processing apparatus 33 in response to transmission of the link node group instruction. If the processing result has been received, the procedure advances to step S1708. If the processing result has not been received, the procedure advances to step S1706.

(Step S1706) The first processing portion 316 judges whether or not time has run out. If time has run out, the procedure advances to step S1707. If time has not run out, the procedure returns to step S1705.

(Step S1707) The first processing portion 316 substitutes an error message for the processing result. The first processing portion 316, for example, holds an error message in advance.

(Step S1708) The first processing portion 316 executes the process corresponding to the object instruction using the processing result of the link node group received in step S1705.

(Step S1709) The first transmitting portion 317 transmits the result information indicating a result of the process to the second information processing apparatus 32. The procedure returns to step S301.

Figure 17:
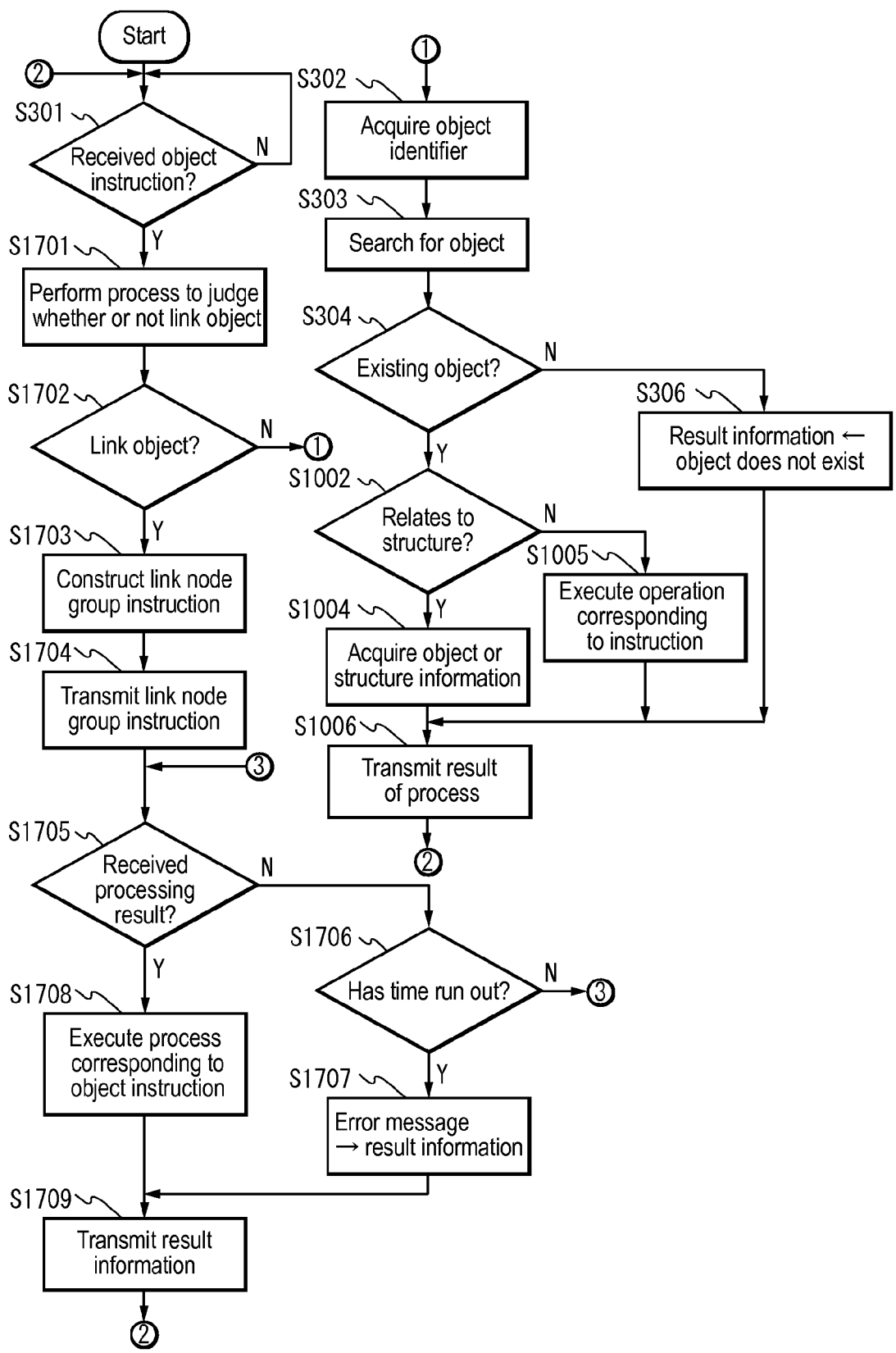
FIG. 17 is a flowchart illustrating an operation of a first information processing apparatus of this embodiment.

Here, the process is terminated by powering off or an interruption to abort the process in the flowchart in FIG. 17.

Figure 18:
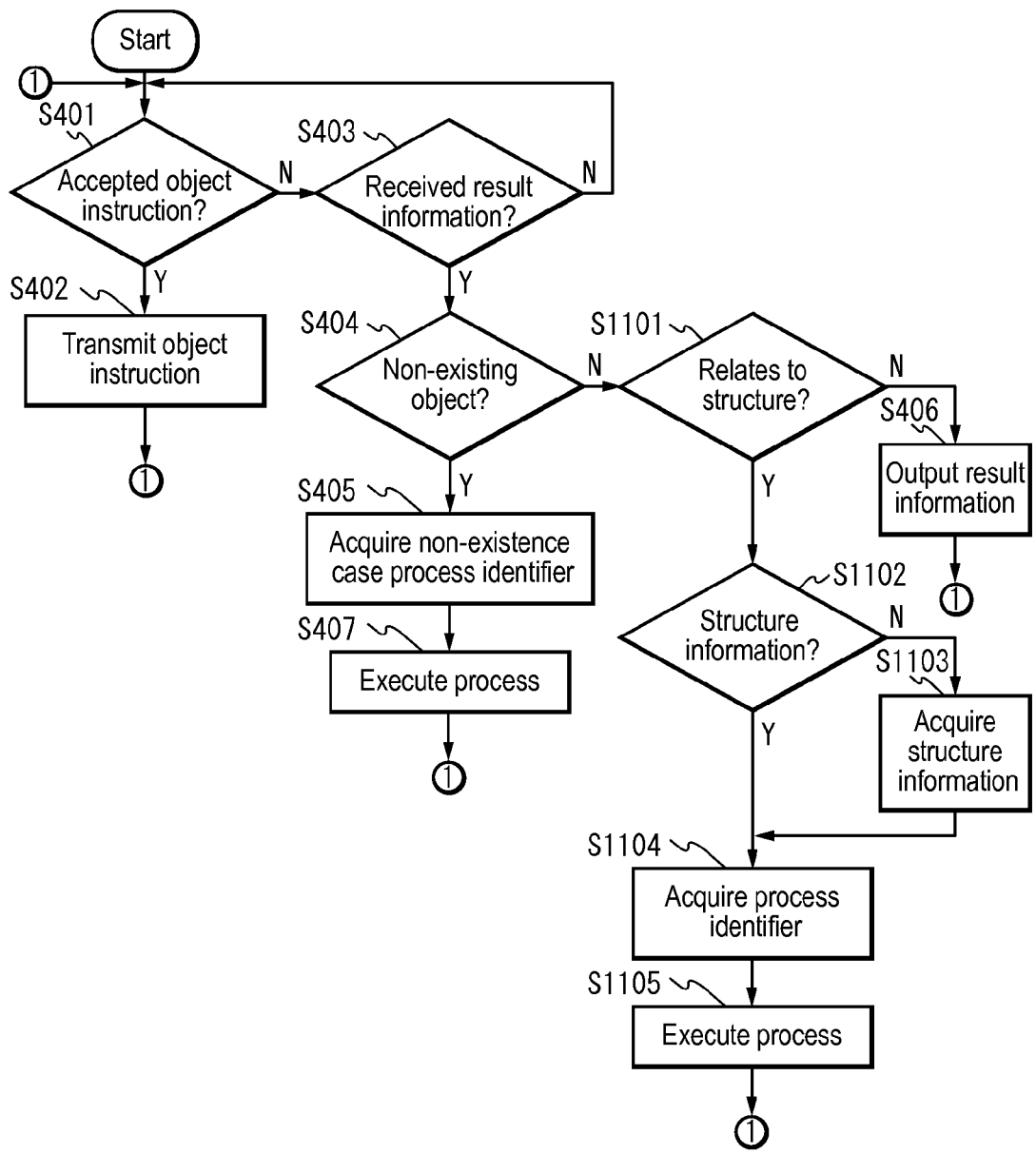
FIG. 18 is a flowchart illustrating an operation of a second information processing apparatus of this embodiment.

FIG. 18 is a flowchart illustrating an operation of the second information processing apparatus 32. The steps constituting the flowchart in FIG. 18 are the same as those in FIG. 4 or 11, and, thus, a description thereof has been omitted.

Here, the process is terminated by powering off or an interruption to abort the process in the flowchart in FIG. 18.

Next, an operation of the third information processing apparatus 33 will be described. First, the third instruction receiving portion 332 of the third information processing apparatus 33 receives the link node group instruction from the first information processing apparatus 31. Next, the third processing portion 333 executes a process corresponding to the link node group instruction, and acquires a processing result. Then, the third transmitting portion 334 transmits the processing result of the third processing portion 333 to the first information processing apparatus 31.

Hereinafter, a specific operation of the information processing system 3 in this embodiment will be described. FIG. 15 is a conceptual diagram of the information processing system 3.

Here, in the first object storage portion 311 of the first information processing apparatus 31, the object shown in FIG. 19 is stored. The object is the link object. Here, the link object is an object in which data of one or more nodes contained in the link object has link information (information containing "http:// . . . " at the head, in this example). In FIG. 19, as data of the node "/items/lamp" of the object, the link information "http://XXX/items/lamp" is provided.

Furthermore, the third object storage portion 331 of the third information processing apparatus 33 holds the object shown in FIG. 20. This object is a linked object to which a link is provided from a node of the object of the first information processing apparatus 31. That is to say, the substantial portions of the node "/items/lamp" of the object shown in FIG. 19 are hierarchical nodes including "/items/lamp" of the object shown in FIG. 20 and nodes therebelow ("/items/lamp", "/items/lamp/price", "/items/lamp/weight", etc.).

In this situation, examples of two cases below will be described.

Specific Example 1

Specific Example 1 shows the case in which a link-destination node exists, and a process is properly executed. First, it is assumed that a user of the second information processing apparatus 32 inputs an object instruction "exec http://game_A/items/lamp/on http://game_A/user/taro/lamp". This object instruction is an instruction to execute the object "http://game_A/items/lamp/on" (one logic) on a lamp (Taro's lamp) identified with the object "http://game_A/user/taro/lamp" (one data). The object "http://game_A/items/lamp/on" is a logic (application) to execute an operation that lights a lamp.

Next, the second accepting portion 122 accepts the object instruction "exec http://game_A/items/lamp/on http://game_A/user/taro/lamp". Then, the second instruction transmitting portion 123 transmits the instruction "exec http://game_A/items/lamp/on http://game_A/user/taro/lamp" to the first information processing apparatus 31.

Next, the first instruction receiving portion 112 of the first information processing apparatus 31 receives the object instruction "exec http://game_A/items/lamp/on http://game_A/user/taro/lamp" from the second information processing apparatus 32.

Then, the first link object judging portion 313 judges whether or not an object corresponding to the link node group instruction received by the first instruction receiving portion 112 is the link object. First, the first link object judging portion 313 judges whether or not the node identified with "http://game_A/items/lamp/on" is the link node group. That is to say, the first link object judging portion 313 judges whether or not data of "/", "/items", "/items/lamp", or "/items/lamp/on" of the node "/items/lamp/on" contains "http://" at the head. According to FIG. 19, data of "/items/lamp" contains "http://" at the head, and, thus, the first link object judging portion 313 judges that the node identified with "http://game_A/items/lamp/on" is the link node group.

Next, the first link node group instruction transmitting portion 314 constructs a link node group instruction. Here, the first link node group instruction transmitting portion 314 constructs a link node group instruction "SEND http://XXX/items/lamp". That is to say, "SEND http://XXX/items/lamp" is an instruction to urge the third information processing apparatus 33 that can be accessed with "http://XXX" to transmit the object "/items/lamp".

Next, the first link node group instruction transmitting portion 314 transmits the constructed link node group instruction "SEND http://XXX/items/lamp" to the third information processing apparatus 33.

Next, the third instruction receiving portion 332 of the third information processing apparatus 33 receives the link node group instruction "SEND http://XXX/items/lamp" from the first information processing apparatus 31.

Next, the third processing portion 333 executes a process corresponding to the link node group instruction "SEND http://XXX/items/lamp". That is to say, the third processing portion 333 acquires the object "/items/lamp" and all nodes therebelow, and converts the data into a data structure that can be transmitted. The data conversion in this example is conversion that compresses a hierarchical node group (the object "/items/lamp" and all nodes therebelow) into one file. This sort of data conversion technique is a known art (e.g., a technique for converting a hierarchical folder into a file in a compressed format such as lzh), and, thus, a detailed description thereof has been omitted. Then, the third transmitting portion 334 transmits a processing result of the third processing portion 333 (the data "/items/lamp" in a format that can be transmitted) to the first information processing apparatus 31.

Next, the first link-destination node group processing result receiving portion 315 receives the processing result (the data "/items/lamp") of the link node group from the third information processing apparatus 33 in response to transmission of the link node group instruction "SEND http://XXX/items/lamp".

Next, the first processing portion 316 decompress the received processing result (the data "/items/lamp") of the link node group, and obtains hierarchical data (data of "/items/lamp/" and all nodes therebelow) of original nodes. Then, the first processing portion 316 adds the node group obtained through decompression after "/items/lamp/" of the object in FIG. 19. Then, the first processing portion 316 obtains "/items/lamp/on" (logic) and the like.

Next, the first link object judging portion 313 judges whether or not "/user/taro/lamp" is the link object in a similar manner. Here, the first link object judging portion 313 judges that "/user/taro/lamp" is not the link object through a method as described above.

Next, the first processing portion 316 executes "exec /items/lamp/on /user/taro/lamp". Then, Taro's lamp is lit. Information on Taro's lamp that has been lit (a moving image or the like) is the result information.

Next, the first transmitting portion 317 transmits the result information indicating a result of the process (information on Taro's lamp that has been lit) to the second information processing apparatus 32.

Next, the second receiving portion 324 of the second information processing apparatus 32 receives the result information (information on Taro's lamp that has been lit) from the first information processing apparatus 31. Then, Taro's lamp is lit, for example, in a moving image on a display screen of the second information processing apparatus 32.

Specific Example 2

Specific Example 2 shows the case in which a link-destination node does not exist, and a process corresponding to the non-existence is executed.

Here, it is assumed that the second non-existence case process information storage portion 321 of the second information processing apparatus 32 holds the non-existence case process information management table shown in FIG. 7.

First, it is assumed that a user of the second information processing apparatus 32 inputs an object instruction "GET http://game_A/user/hanako/lamp/". Here, "GET http://game_A/user/hanako/lamp/" is an instruction (command) to acquire the object "http://game_A/user/hanako/lamp/" (including this node and all nodes in the levels therebelow).

Next, the second accepting portion 122 accepts the object instruction "GET http://game_A/user/hanako/lamp/". Then, the second instruction transmitting portion 123 transmits the instruction "GET http://game_A/user/hanako/lamp/" to the first information processing apparatus 31.

Next, the first instruction receiving portion 112 of the first information processing apparatus 31 receives the object instruction "GET http://game_A/user/hanako/lamp/" from the second information processing apparatus 32.

Then, the first link object judging portion 313 judges whether or not an object corresponding to the link node group instruction received by the first instruction receiving portion 112 is the link object. First, the first link object judging portion 313 judges whether or not any node of "http://game_A/user/hanako/lamp/" and all nodes therebelow is the link node. That is to say, the first link object judging portion 313 judges whether or not data of "/", "/user", "/user/hanako", "/user/hanako/lamp/", or nodes therebelow of the node "/user/hanako/lamp/" contains "http://" at the head. According to FIG. 19, data of "/user/hanako" contains "http://" at the head, and, thus, the first link object judging portion 313 judges that the node identified with "http://game_A/user/hanako/lamp/" is the link node group.

Next, the first link node group instruction transmitting portion 314 constructs a link node group instruction. Here, the first link node group instruction transmitting portion 314 constructs a link node group instruction "SEND http://XXX/user/hanako/lamp".

Next, the first link node group instruction transmitting portion 314 transmits the constructed link node group instruction "SEND http://XXX/user/hanako/lamp" to the third information processing apparatus 33.

Next, the third instruction receiving portion 332 of the third information processing apparatus 33 receives the link node group instruction "SEND http://XXX/user/hanako/lamp" from the first information processing apparatus 31.

Next, the third processing portion 333 executes a process corresponding to the link node group instruction "SEND http://XXX/user/hanako/lamp". That is to say, the third processing portion 333 tries to acquire the object "/user/hanako/lamp" and all nodes therebelow. However, in the third object storage portion 331 of the third information processing apparatus 33, the object "/user/hanako/lamp" does not exist, and, thus, the third processing portion 333 obtains an error code (e.g., "−1"). Here, the error code (e.g., "−1") is information indicating the non-existence of an object.

Next, the third transmitting portion 334 transmits the error code (e.g., "−1") to the first information processing apparatus 31.

Next, the first link-destination node group processing result receiving portion 315 receives the error code (e.g., "−1").

Next, the first object non-existence information acquiring portion 113 substitutes the result information (e.g., "−1") to the effect that the object does not exist, which is obtained from the received processing result (error code), for the result information.

Next, the first transmitting portion 317 transmits the result information (e.g., "−1") to the effect that the object does not exist to the second information processing apparatus 32.

Next, the second receiving portion 324 receives the result information (e.g., "−1") from the first information processing apparatus 31.

Next, the second processing portion 325 judges that the received result information (e.g., "−1") is information to the effect that the object does not exist.

Next, the second processing portion 325 acquires the non-existence case process identifier corresponding to the object identifier "/user/hanako/lamp" contained in the object instruction from the non-existence case process information management table in FIG. 7. That is to say, the second processing portion 325 acquires "install(lamp,/user/*); buy_fuel(50); light(/user/*/lamp);", and substitutes "hanako", which is part of the corresponding object identifier "/user/hanako/lamp", for "*". Then, the second processing portion 325 obtains "install(lamp,/user/hanako); buy_fuel(50); light(/user/hanako/lamp);".

Then, the second processing portion 325 executes the process "install(lamp,/user/hanako); buy_fuel(50); light(/user/hanako/lamp);" corresponding to the acquired non-existence case process identifier.

As a result of executing "install(lamp,/user/hanako/)", a node "lamp" is added to the level below the object "/user/hanako".

Furthermore, as a result of executing "buy_fuel(50)", a node "fuel" is added to the level below the object "/user/hanako/lamp", and data "50" is written to the object "/user/hanako/lamp/fuel".

Moreover, as a result of executing "light(/user/hanako/lamp)", Hanako's lamp is lit. That is to say, Hanako's lamp is lit, for example, in a moving image on a display screen of the second information processing apparatus 32.

As described above, according to this embodiment, it is also possible to deal with an instruction for a link object including a link to an object of another apparatus. That is to say, a link to an object existing in one apparatus can be provided from an object of another apparatus, and one virtual large object can be constructed, and, thus, distributed development of application (software) can be easily performed.

Here, the software that realizes the first information processing apparatus in this embodiment may be the following sort of program. Specifically, this program is a program for causing a computer, in which at least one object having at least one data node and at least one application node that are hierarchical is stored in a storage medium, to function as: a first instruction receiving portion that receives an object instruction, which is an instruction having an object identifier for identifying an object and is an instruction for the object, from a second information processing apparatus; a first link object judging portion that judges whether or not the object corresponding to the object instruction is a link object; a first link node group instruction transmitting portion that transmits a link node group instruction to a third information processing apparatus, which is a link-destination apparatus of the link object, in a case where the first link object judging portion judges that the object is the link object; a first link-destination node group processing result receiving portion that receives a processing result of a link node group from the third information processing apparatus in response to transmission of the link node group instruction; a first processing portion that acquires result information, which is the processing result or a result of a process executed according to the processing result; and a first transmitting portion that transmits the result information to the second information processing apparatus.

Furthermore, the software that realizes the second information processing apparatus may be the following sort of program. Specifically, this program is a program for causing a computer to function as: a second accepting portion that accepts an object instruction; a second instruction transmitting portion that transmits the object instruction to a first information processing apparatus; a second receiving portion that receives result information transmitted by the first information processing apparatus; and a second output portion that outputs the result information received by the second receiving portion.

Furthermore, the software that realizes the third information processing apparatus may be the following sort of program. Specifically, this program is a program for causing a computer, in which at least one object having a link from a node of one object of a first object storage portion of a first information processing apparatus is stored in a storage medium, to function as: a third instruction receiving portion that receives a link node group instruction, which is an instruction for a link-destination node, or the link-destination node and a node group therebelow, from the first information processing apparatus; a third processing portion that executes a process corresponding to the link node group instruction, and acquires a processing result; and a third transmitting portion that transmits the processing result to the first information processing apparatus.

Embodiment 4

In this embodiment, an information processing system will be described that has not only the first information processing apparatus in which an object wherein nodes are hierarchical is stored and the second information processing apparatus that executes a process using the object but also a third information processing apparatus, wherein a link can be provided from an object of the first information processing apparatus to an object of the third information processing apparatus. In this embodiment, a method for processing one object in the case where one object is a link object including a link to an object of another apparatus will be described. Here, in this embodiment, a process using a method different from that described in Embodiment 3 will be described.

A conceptual diagram of an information processing system 4 in this embodiment is similar to that in FIG. 15. The information processing system 4 is provided with first information processing apparatuses 41, second information processing apparatuses 42, and third information processing apparatuses 43.

Figure 21:
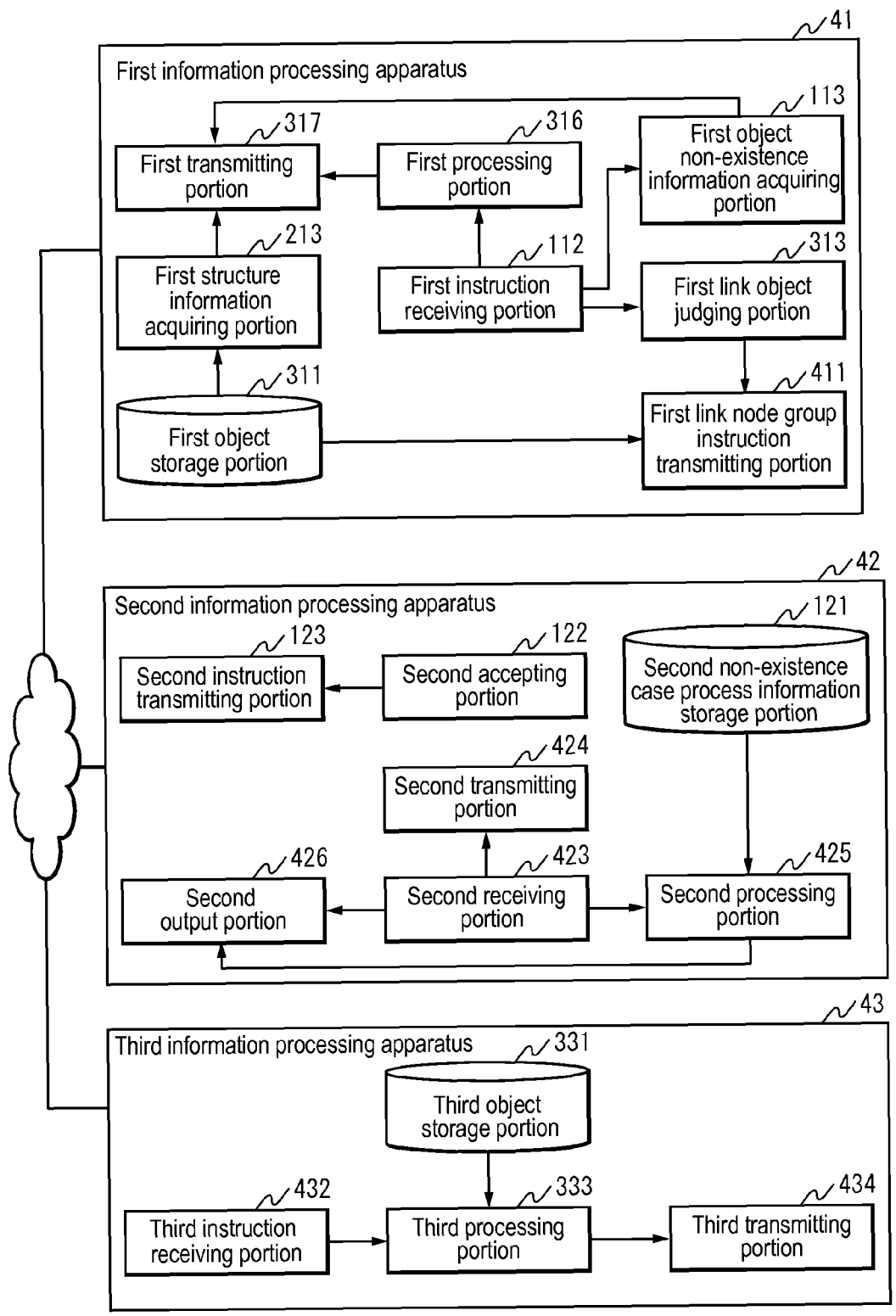
FIG. 21 is a block diagram of an information processing system in Embodiment 4.

FIG. 21 is a block diagram of the information processing system 4 in this embodiment. The first information processing apparatus 41 is provided with the first object storage portion 311, the first instruction receiving portion 112, the first link object judging portion 313, the first processing portion 316, a first link node group instruction transmitting portion 411, the first transmitting portion 317, the first object non-existence information acquiring portion 113, and the first structure information acquiring portion 213.

The second information processing apparatus 42 is provided with the second accepting portion 122, the second instruction transmitting portion 123, a second receiving portion 423, a second transmitting portion 424, a second processing portion 425, and a second output portion 426.

The third information processing apparatus 43 is provided with the third object storage portion 331, a third instruction receiving portion 432, the third processing portion 333, and a third transmitting portion 434.

If the first link object judging portion 313 judges that the object is the link object, the first link node group instruction transmitting portion 411 transmits a link-destination node identifier for identifying the link-destination node to the second information processing apparatus 42. More specifically, first, the first link node group instruction transmitting portion 411 acquires information for accessing a link object of the third information processing apparatus 43 (link-destination node identifier) from the first object storage portion 311. Next, the first link node group instruction transmitting portion 411 acquires communication-destination information (e.g., an IP address, etc.) of the second information processing apparatus 42 that has transmitted the object instruction received by the first instruction receiving portion 112. Then, the first link node group instruction transmitting portion 411 transmits a link-destination node identifier for identifying the link-destination node to the second information processing apparatus 42. The first link node group instruction transmitting portion 411 is realized typically as a wireless or wired communication unit, but may also be realized as a broadcasting unit.

The second receiving portion 423 receives a link-destination node identifier for identifying the link-destination node from the first information processing apparatus 41 in response to transmission of the object instruction. Furthermore, the second receiving portion 423 receives the result information from the third information processing apparatus 43 in response to transmission of the link node group instruction. Here, the link node group instruction is an instruction to process a link-destination node group identified with the link-destination node identifier. Moreover, the second receiving portion 423 may receive the result information from an external apparatus such as the first information processing apparatus 41. The second receiving portion 423 is realized typically as a wireless or wired communication unit, but may also be realized as a unit that receives a broadcast.

The second transmitting portion 424 transmits a link node group instruction, which is an instruction to process a link-destination node group identified with the link-destination node identifier, to the third information processing apparatus 43 corresponding to the link-destination node identifier. The second transmitting portion 424 is realized typically as a wireless or wired communication unit, but may also be realized as a broadcasting unit.

The second output portion 426 outputs the result information received by the second receiving portion 423. The second output portion 426 may be considered to include or not to include an output device, such as a display screen or a loudspeaker. The second output portion 426 may be realized as driver software for an output device, or a combination of driver software for an output device and the output device.

The third instruction receiving portion 432 receives the link node group instruction, which is an instruction for a link-destination node, or the link-destination node and a node group therebelow, from the second information processing apparatus 42. The third instruction receiving portion 432 is realized typically as a wireless or wired communication unit, but may also be realized as a unit that receives a broadcast.

The third transmitting portion 434 transmits the result information to the second information processing apparatus 42. The result information is a processing result obtained by executing a process corresponding to the link node group instruction. The result information is, for example, an object identified with the object identifier contained in the link node group instruction. The third transmitting portion 434 is realized typically as a wireless or wired communication unit, but may also be realized as a broadcasting unit.

Next, an operation of the information processing system 4 will be described. First, an operation of the first information processing apparatus 41 will be described with reference to the flowchart in FIG. 22. In the flowchart in FIG. 22, a description of the same steps as those in the flowchart in FIG. 3, 10, or 17 has been omitted.

(Step S2201) The first link node group instruction transmitting portion 411 constructs a link node group instruction. The first link node group instruction transmitting portion 411 constructs "GET http://game_B/xxx/yyy", for example, using data of the link node (e.g., "http://game_B/xxx/yyy") and the command identifier (e.g., GET) that is held in advance, and stores it in the memory.

(Step S2202) The first link node group instruction transmitting portion 411 transmits the link node group instruction constructed in step S2201 to the second information processing apparatus 42.

Figure 22:
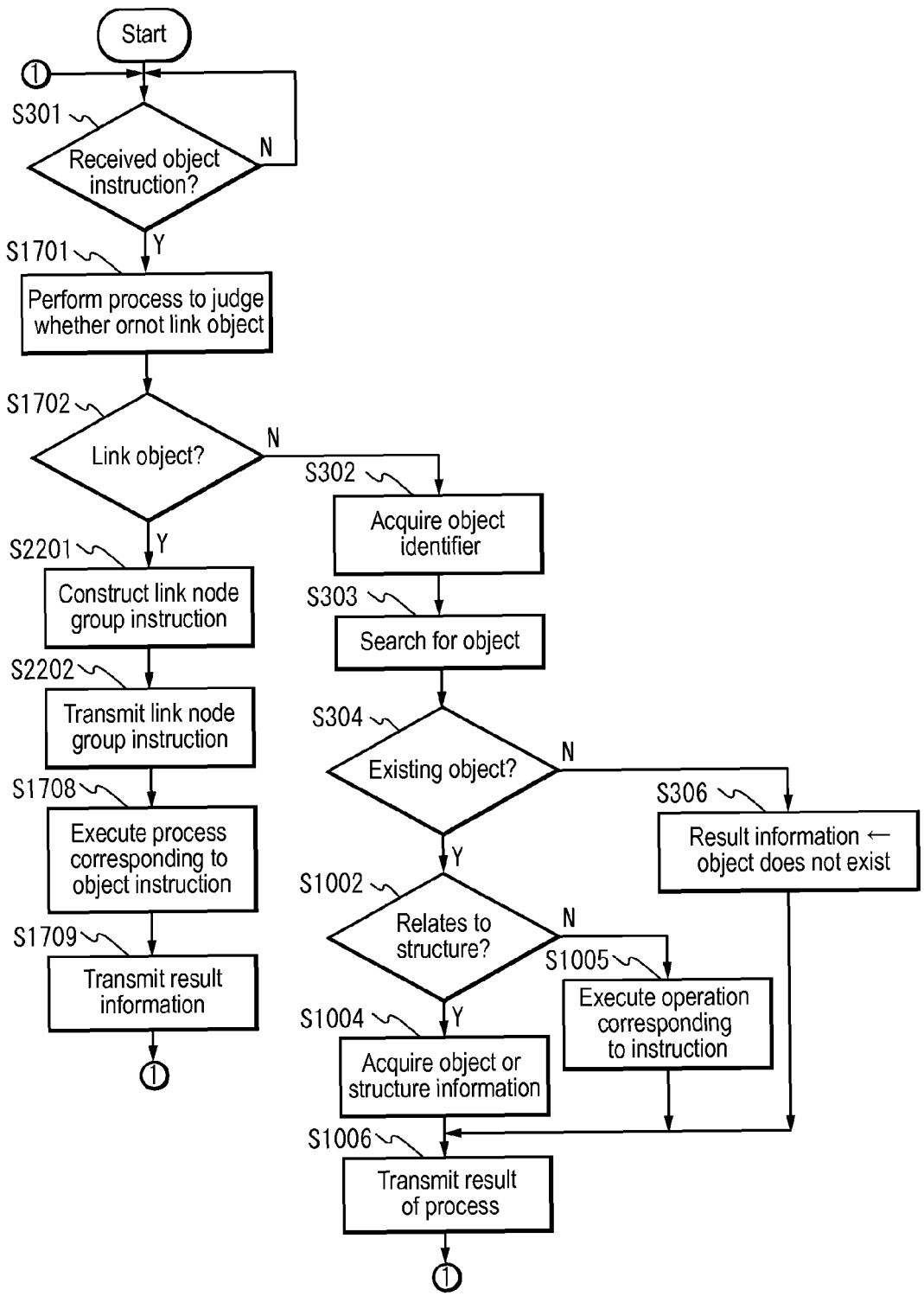
FIG. 22 is a flowchart illustrating an operation of a first information processing apparatus of this embodiment.

Here, the process is terminated by powering off or an interruption to abort the process in the flowchart in FIG. 22.

Next, an operation of the second information processing apparatus 42 will be described with reference to the flowchart in FIG. 23. In the flowchart in FIG. 23, a description of the same steps as those in FIG. 4 or 11 has been omitted.

(Step S2301) The second transmitting portion 424 judges whether or not the instruction received by the second receiving portion 423 from the first information processing apparatus 41 is the link node group instruction. If the instruction is the link node group instruction, the procedure advances to step S2302. If the instruction is not the link node group instruction, the procedure advances to step S2304.

(Step S2302) The second transmitting portion 424 transmits the link node group instruction received by the second receiving portion 423 from the first information processing apparatus 41, to the third information processing apparatus 43. Here, the link node group instruction contains information for accessing the third information processing apparatus 43 (a URI, an IP address, etc.).

(Step S2303) The second receiving portion 423 judges whether or not result information indicating a result of the process in the third information processing apparatus 43 has been received in response to transmission of the link node group instruction in step S2302. If the result information has been received, the procedure advances to step S2304. If the result information has not been received, the procedure returns to step S2303. Here, in step S2303, if time has run out, a process that acquires an error code as the processing result may be executed. The error code is, for example, information to the effect that an object (link node group) corresponding to the link node group instruction cannot be accessed. Furthermore, in the case where the object corresponding to the link node group instruction cannot be accessed, it may be judged that the object corresponding to the link node group instruction does not exist, and the second processing portion 425 may execute a process of the case where the object does not exist. The process of this case has been already described.

(Step S2304) The second processing portion 425 executes a process using the result information received from the first information processing apparatus 41 and the result information received from the third information processing apparatus 43. The content of the process corresponds to the object instruction. There may be various types of contents of the process.

(Step S2305) The second output portion 426 outputs the processing result (result information) in step S2304. The procedure returns to step S401.

Figure 23:
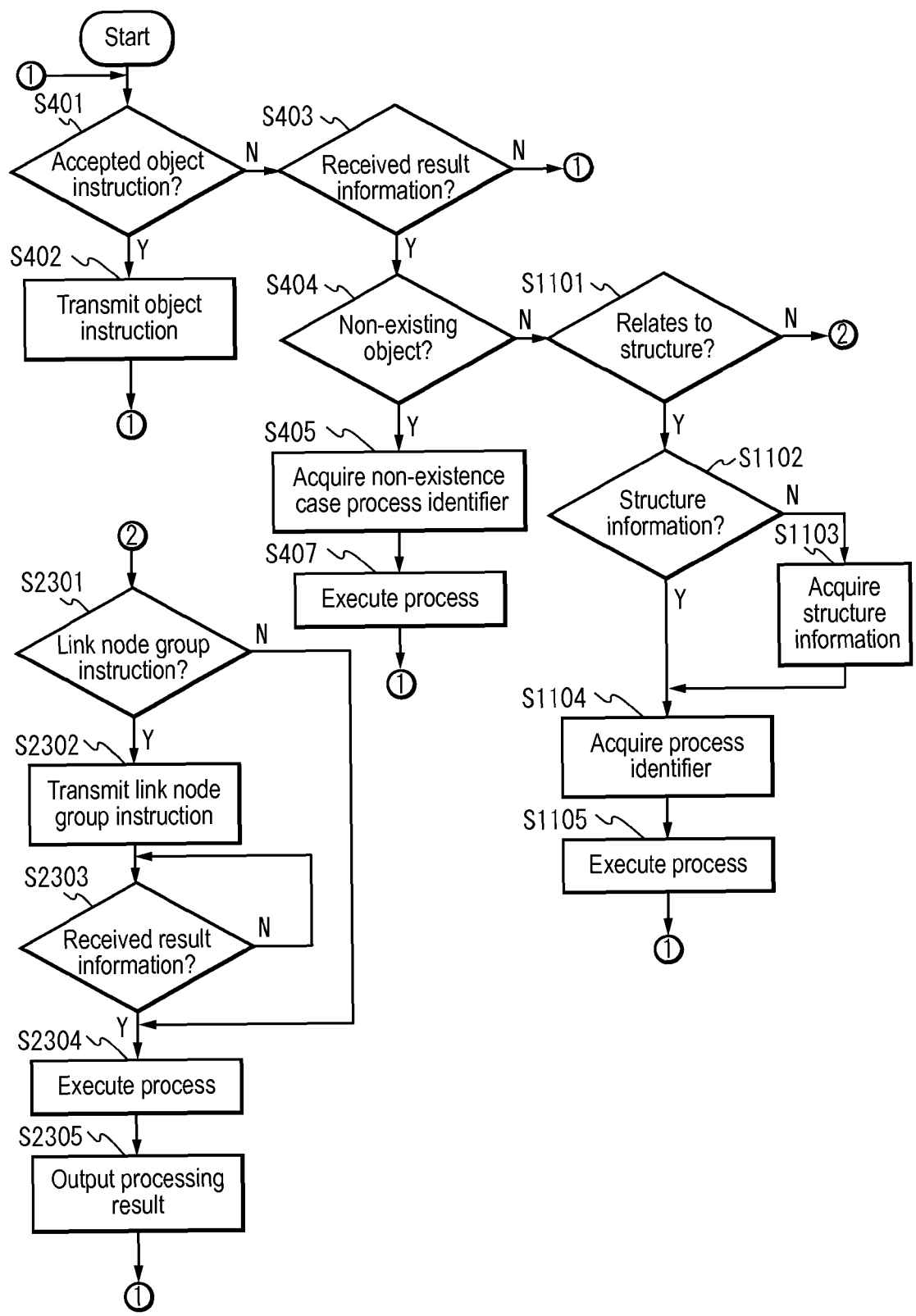
FIG. 23 is a flowchart illustrating an operation of a second information processing apparatus of this embodiment.

Here, the process is terminated by powering off or an interruption to abort the process in the flowchart in FIG. 23.

Next, an operation of the third information processing apparatus 43 will be described. First, the third instruction receiving portion 432 of the third information processing apparatus 43 receives the link node group instruction from the second information processing apparatus 42. Next, the third processing portion 333 executes a process corresponding to the link node group instruction, and acquires a processing result. Then, the third transmitting portion 434 transmits the processing result of the third processing portion 333 to the second information processing apparatus 42.

Hereinafter, a specific operation of the information processing system 4 in this embodiment will be described. A conceptual diagram of the information processing system 4 is similar to that in FIG. 15.

Here, in the first object storage portion 311 of the first information processing apparatus 41, the object shown in FIG. 19 is stored. The object is the link object.

Furthermore, the third object storage portion 331 of the third information processing apparatus 43 holds the object shown in FIG. 20.

In this situation, examples of two cases below will be described.

Specific Example 1

Specific Example 1 shows the case in which a link-destination node exists, and a process is properly executed. First, it is assumed that a user of the second information processing apparatus 42 inputs an object instruction "exec http://game_A/items/lamp/on http://game_A/user/taro/lamp". This object instruction is an instruction to execute the object "http://game_A/items/lamp/on" (one logic) on a lamp (Taro's lamp) identified with the object "http://game_A/user/taro/lamp" (one data).

Next, the second accepting portion 122 accepts the object instruction "exec http://game_A/items/lamp/on http://game_A/user/taro/lamp". Then, the second instruction transmitting portion 123 transmits the instruction "exec http://game_A/items/lamp/on http://game_A/user/taro/lamp" to the first information processing apparatus 41.

Next, the first instruction receiving portion 112 of the first information processing apparatus 41 receives the object instruction "exec http://game_A/items/lamp/on http://game_A/user/taro/lamp" from the second information processing apparatus 42.

Then, the first link object judging portion 313 judges whether or not an object corresponding to the link node group instruction received by the first instruction receiving portion 112 is the link object. Then, the first link object judging portion 313 judges that the node identified with "http://game_A/items/lamp/on" is the link node group using the process described in Embodiment 3.

Next, the first link node group instruction transmitting portion 411 constructs a link node group instruction. Here, the first link node group instruction transmitting portion 411 constructs a link node group instruction "SEND http://XXX/items/lamp".

Next, the first link node group instruction transmitting portion 411 transmits the constructed link node group instruction "SEND http://XXX/items/lamp" to the second information processing apparatus 42.

Furthermore, the first processing portion 316 reads the object corresponding to the object identifier "http://game_A/user/taro/lamp" contained in the object instruction "exec http://game_A/items/lamp/on http://game_A/user/taro/lamp" from the first object storage portion 311.

Then, the first transmitting portion 317 converts the object "/user/taro/lamp" into a format that can be transmitted, and transmits it to the second information processing apparatus 42.

Next, the second receiving portion 423 of the second information processing apparatus 42 receives the link node group instruction "SEND http://XXX/items/lamp" from the first information processing apparatus 41.

Then, the second transmitting portion 424 judges that the instruction received by the second receiving portion 423 is the link node group instruction.

Next, the second transmitting portion 424 transmits the link node group instruction "SEND http://XXX/items/lamp" received by the second receiving portion 423 to the third information processing apparatus 43. Here, the link node group instruction transmitted by the second transmitting portion 424 may also be "SEND /items/lamp". That is to say, in the link node group instruction transmitted by the second transmitting portion 424, a protocol name, a domain name, and the like may be excluded.

Next, the third instruction receiving portion 432 of the third information processing apparatus 43 receives the link node group instruction (e.g., "SEND /items/lamp") from the second information processing apparatus 42.

Next, the third processing portion 333 executes a process corresponding to the link node group instruction "SEND /items/lamp", and acquires a processing result. Here, the processing result is a process that acquires an object including the node "/items/lamp" and all node groups therebelow.

Then, the third transmitting portion 434 converts the processing result of the third processing portion 333 into a format that can be transmitted (e.g., converts the processing result into a file format such as lzh), and transmits the processing result to the second information processing apparatus 42.

Next, the second receiving portion 423 of the second information processing apparatus 42 receives the result information indicating a result of the process in the third information processing apparatus 43 (information obtained by converting the processing result into a format that can be transmitted) in response to transmission of the link node group instruction to the third information processing apparatus 43.

Furthermore, the second receiving portion 423 of the second information processing apparatus 42 receives the object "/user/taro/lamp" from the first information processing apparatus 41. Here, for example, the received object is not hierarchical, and is one file.

Next, the second processing portion 425 executes a process using the result information received from the first information processing apparatus 41 and the result information received from the third information processing apparatus 43. Then, the second output portion 426 outputs the processing result. Here, it is assumed that the second processing portion 425 also executes a process that changes information received from an external apparatus (e.g., information that maintains hierarchical relationship of nodes and that has been compressed) into information of the original hierarchical node group.

Specific Example 2

Specific Example 2 shows the case in which a link-destination node does not exist, and a process corresponding to the non-existence is executed.

Here, it is assumed that the second non-existence case process information storage portion 321 of the second information processing apparatus 42 holds the non-existence case process information management table shown in FIG. 7.

First, it is assumed that a user of the second information processing apparatus 42 inputs an object instruction "GET http://game_A/user/hanako/lamp/".

Next, the second accepting portion 122 accepts the object instruction "GET http://game_A/user/hanako/lamp/". Then, the second instruction transmitting portion 123 transmits the instruction "GET http://game_A/user/hanako/lamp/" to the first information processing apparatus 41.

Next, the first instruction receiving portion 112 of the first information processing apparatus 41 receives the object instruction "GET http://game_A/user/hanako/lamp/" from the second information processing apparatus 42.

Then, the first link object judging portion 313 judges whether or not an object corresponding to the link node group instruction received by the first instruction receiving portion 112 is the link object. According to FIG. 20, data of "/user/hanako" contains "http://" at the head, and, thus, the first link object judging portion 313 judges that the node identified with "http://game_A/user/hanako/lamp/" is the link node group.

Next, the first link node group instruction transmitting portion 411 constructs a link node group instruction. Here, the first link node group instruction transmitting portion 411 constructs a link node group instruction "SEND http://XXX/user/hanako/lamp".

Next, the first link node group instruction transmitting portion 411 transmits the constructed link node group instruction "SEND http://XXX/user/hanako/lamp" to the second information processing apparatus 42.

Next, the second receiving portion 423 of the second information processing apparatus 42 receives the link node group instruction "SEND http://XXX/user/hanako/lamp" from the first information processing apparatus 41.

Then, the second transmitting portion 424 judges that the instruction received by the second receiving portion 423 from the first information processing apparatus 41 is the link node group instruction.

Next, the second transmitting portion 424 transmits the link node group instruction "SEND http://XXX/user/hanako/lamp" received by the second receiving portion 423 from the first information processing apparatus 41, to the third information processing apparatus 43. Here, the link node group instruction transmitted by the second transmitting portion 424 may also be "SEND/user/hanako/lamp". That is to say, in the link node group instruction transmitted by the second transmitting portion 424, a protocol name, a domain name, and the like may be excluded.

Next, the third instruction receiving portion 432 of the third information processing apparatus 43 receives the link node group instruction (e.g., "SEND/user/hanako/lamp") from the second information processing apparatus 42.

Next, the third processing portion 333 executes a process corresponding to the link node group instruction "SEND /user/hanako/lamp", and acquires a processing result. Here, the processing result is information to the effect that the node "/user/hanako/lamp" does not exist (e.g., "−1").

Then, the third transmitting portion 434 transmits the information to the effect that the node "/user/hanako/lamp" does not exist to the second information processing apparatus 42.

Next, the second receiving portion 423 of the second information processing apparatus 42 receives the information to the effect that the node "/user/hanako/lamp" does not exist (e.g., "−1") in response to transmission of the link node group instruction to the third information processing apparatus 43.

Next, the second processing portion 425 judges that the received result information (e.g., "−1") is information to the effect that the object does not exist.

Next, the second processing portion 425 acquires the non-existence case process identifier corresponding to the object identifier "/user/hanako/lamp" contained in the object instruction from the non-existence case process information management table in FIG. 7. That is to say, the second processing portion 425 acquires "install(lamp,/user/*); buy_fuel (50); light(/user/*/lamp);", and substitutes "hanako", which is part of the corresponding object identifier "/user/hanako/lamp", for "*". Then, the second processing portion 425 obtains "install(lamp,/user/hanako); buy_fuel(50); light(/user/hanako/lamp);".

Then, the second processing portion 425 executes the process "install(lamp,/user/hanako); buy_fuel(50); light(/user/hanako/lamp);" corresponding to the acquired non-existence case process identifier.

As a result of executing "install(lamp,/user/hanako/)", a node "lamp" is added to the level below the object "/user/hanako".

Furthermore, as a result of executing "buy_fuel(50)", a node "fuel" is added to the level below the object "/user/hanako/lamp", and data "50" is written to the object "/user/hanako/lamp/fuel".

Moreover, as a result of executing "light(/user/hanako/lamp)", Hanako's lamp is lit. That is to say, Hanako's lamp is lit, for example, in a moving image on a display screen of the second information processing apparatus 42.

As described above, according to this embodiment, it is also possible to deal with an instruction for a link object including a link to an object of another apparatus. That is to say, a link to an object existing in one apparatus can be provided from an object of another apparatus, and one virtual large object can be constructed, and, thus, distributed development of application (software) can be easily performed.

Here, in Embodiments 3 and 4 described above, different methods for processing the link object were respectively described. However, in one information processing system, the method for processing the link object in Embodiment 3 (first method) and the method for processing the link object in Embodiment 4 (second method) may be used together. In this case, for example, the first information processing apparatus may acquire information relating to loading to the first information processing apparatus (situations such as CPU loading, usage situation of resources, or network loading) and information relating to loading to the second information processing apparatus (situations such as CPU loading, usage situation of resources, or network loading), dynamically select either the first method or the second method based on the information relating to loading, and process the link object. More specifically, for example, in the case where loading to the first information processing apparatus is larger than a threshold value or loading to the second information processing apparatus is smaller than a threshold value, the link object may be processed using the second method. Furthermore, in the case where loading to the second information processing apparatus is larger than a threshold value or loading to the first information processing apparatus is smaller than a threshold value, the link object may be processed using the first method.

Furthermore, it will be appreciated that, in response to selection of the processing method in the first information processing apparatus (selection of the first method or the second method), the second information processing apparatus uses the same method to process the link object in cooperation with the first information processing apparatus. Furthermore, the first method or the second method may be selected by the second information processing apparatus or another apparatus.

Furthermore, the first information processing apparatus or the second information processing apparatus may process the link object, for example, by sequentially and dynamically selecting either the first method or the second method.

Furthermore, the software that realizes the first information processing apparatus in this embodiment may be the following sort of program. Specifically, this program is a program for causing a computer, in which at least one object having at least one data node and at least one application node that are hierarchical is stored in a storage medium, to function as: a first instruction receiving portion that receives an object instruction, which is an instruction having an object identifier for identifying an object and is an instruction for the object, from a second information processing apparatus; a first link object judging portion that judges whether or not the object corresponding to the object instruction is a link object; and a first link node group instruction transmitting portion that transmits a link-destination node identifier for identifying a link-destination node to the second information processing apparatus, in a case where the link object judging portion judges that the object is the link object.

Furthermore, the software that realizes the second information processing apparatus may be the following sort of program. Specifically, this program is a program for causing a computer to function as: a second accepting portion that accepts an object instruction; a second instruction transmitting portion that transmits the object instruction to a first information processing apparatus; a second receiving portion that receives a link-destination node identifier for identifying a link-destination node from the first information processing apparatus in response to transmission of the object instruction, and that receives result information from a third information processing apparatus in response to transmission of a link node group instruction; a second transmitting portion that transmits the link node group instruction, which is an instruction to process a link-destination node group identified with the link-destination node identifier, to the third information processing apparatus corresponding to the link-destination node identifier; and a second output portion that outputs the result information received by the second receiving portion.

Furthermore, the software that realizes the third information processing apparatus may be the following sort of program. Specifically, this program is a program for causing a computer, in which at least one object having a link from a node of one object of a first object storage portion of a first information processing apparatus is stored in a storage medium, to function as: a third instruction receiving portion that receives a link node group instruction, which is an instruction for a link-destination node, or the link-destination node and a node group therebelow, from a second information processing apparatus; a third processing portion that executes a process corresponding to the link node group instruction, and acquires a processing result; and a third transmitting portion that transmits the processing result to the second information processing apparatus.

Figure 24:
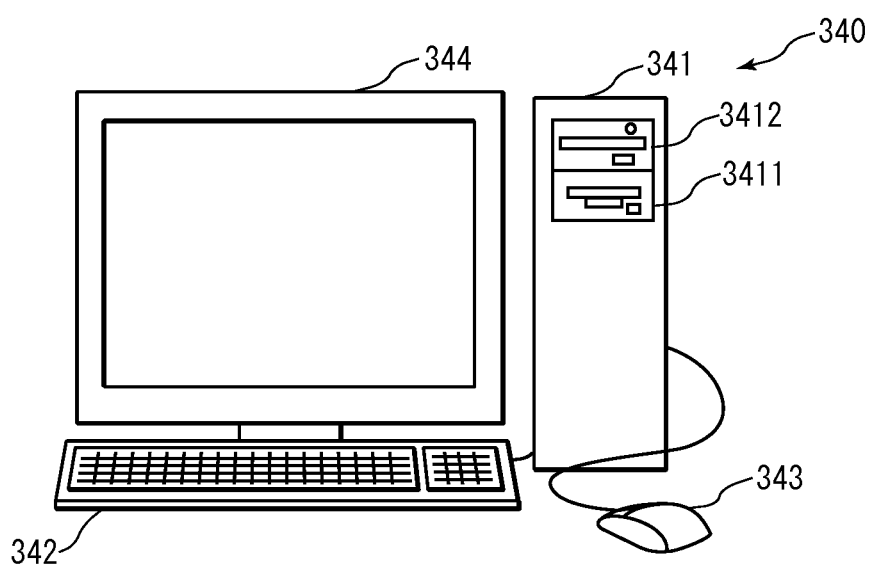
FIG. 24 is a schematic view of a computer system of this embodiment.
Figure 25:
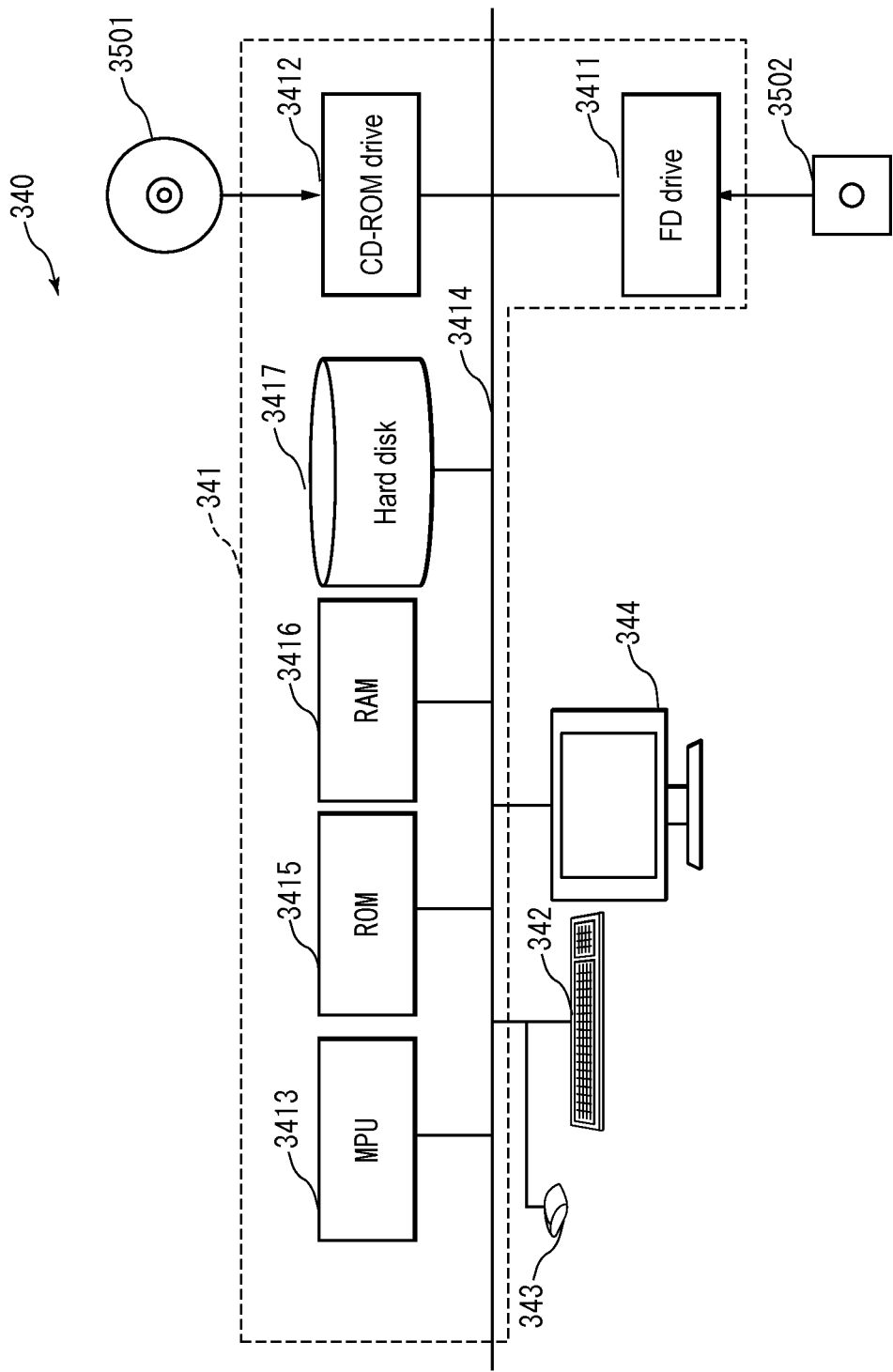
FIG. 25 is a diagram showing the internal configuration of the computer system of this embodiment.

FIG. 24 shows the external appearance of a computer that executes the programs described in this specification to realize the information processing apparatuses and the like in the foregoing embodiments. The foregoing embodiments may be realized using computer hardware and a computer program executed thereon. FIG. 24 is a schematic view of a computer system 340. FIG. 25 is a diagram showing the internal configuration of the computer system 340.

In FIG. 24, the computer system 340 includes a computer 341 including an FD drive 3411 and a CD-ROM drive 3412, a keyboard 342, a mouse 343, and a monitor 344.

In FIG. 25, the computer 341 includes not only the FD drive 3411 and the CD-ROM drive 3412, but also an MPU 3413, a bus 3414 that is connected to the CD-ROM drive 3412 and the FD drive 3411, a ROM 3415 in which a program such as a startup program is to be stored, a RAM 3416 that is connected to the CPU 3413 and in which a command of an application program is temporarily stored and a temporary storage area is to be provided, and a hard disk 3417 in which an application program, a system program, and data are to be stored. Although not shown, the computer 341 may further include a network card that provides connection to a LAN.

The program for causing the computer system 340 to execute the functions of the first, the second, and the third information processing apparatuses and the like in the foregoing embodiments may be stored in a CD-ROM 3501 or an FD 3502, inserted into the CD-ROM drive 3412 or the FD drive 3411, and transmitted to the hard disk 3417. Alternatively, the program may be transmitted via a network (not shown) to the computer 341 and stored in the hard disk 3417. At the time of execution, the program is loaded into the RAM 3416. The program may be loaded from the CD-ROM 3501 or the FD 3502, or directly from a network.

The program does not necessarily have to include, for example, an operating system (OS) or a third party program to cause the computer 341 to execute the functions of the first, the second, and the third information processing apparatuses and the like in the foregoing embodiments. The program may only include a command portion to call an appropriate function (module) in a controlled mode and obtain the desired results. The manner in which the computer system 340 operates is well known, and, thus, a detailed description thereof has been omitted.

It should be noted that, in the program, in a transmitting step of transmitting information, a receiving step of receiving information, or the like, a process performed by hardware, for example, a process performed by a modem or an interface card in the transmitting step (a process that can be performed only by such hardware) is not included.

Furthermore, the computer that executes this program may be a single computer, or may be multiple computers. More specifically, centralized processing may be performed, or distributed processing may be performed.

Furthermore, in the foregoing embodiments, it will be appreciated that two or more communication units (a terminal information transmitting portion, a terminal information receiving portion, etc.) in one apparatus may be physically realized as one medium.

Furthermore, in the foregoing embodiments, each process (each function) may be realized as an integrated process using a single apparatus (system), or may be realized as a distributed process using multiple apparatuses.

The present invention is not limited to the embodiments set forth herein. Various modifications are possible within the scope of the present invention.

INDUSTRIAL APPLICABILITY

As described above, the information processing system according to the present invention has an effect that this system can develop a program utilizing advantages of a hierarchical object, and, thus, this system is useful as an information processing system and the like.

LIST OF REFERENCE NUMERALS 1, 2, 3, 4 Information processing system
11, 21, 31, 41 First information processing apparatus
12, 22, 32, 42 Second information processing apparatus
33, 43 Third information processing apparatus
111, 311 First object storage portion
112 First instruction receiving portion
113 First object non-existence information acquiring portion
114, 214, 316 First processing portion
115, 215, 317 First transmitting portion
121 Second non-existence case process information storage portion
122 Second accepting portion
123 Second instruction transmitting portion
124, 224, 324, 423 Second receiving portion
125, 225, 325, 425 Second processing portion
126, 226, 326, 426 Second output portion
213 First structure information acquiring portion
313 First link object judging portion
314, 411 First link node group instruction transmitting portion
315 First link-destination node group processing result receiving portion
331 Third object storage portion
332, 432 Third instruction receiving portion
333 Third processing portion
334, 434 Third transmitting portion
424 Second transmitting portion
2251 Structure and process information storage unit
2252 Processing unit

The invention claimed is:

1. An information processing system, comprising:
a first information processing apparatus; and
a second information processing apparatus,
wherein the first information processing apparatus includes:
a first object storage portion in which at least one object having at least one data node and at least one application node that are hierarchical can be stored;
a first instruction receiving portion that receives an object instruction, which is an instruction having an object identifier for identifying an object and is an instruction for the object, from the second information processing apparatus;
a first object non-existence information acquiring portion that judges whether or not the object identified with the object identifier exists in the first object storage portion, and acquires information to an effect that the object identified with the object identifier contained in the object instruction does not exist, in a case where the object does not exist in the first object storage portion;
a first processing portion that processes the object identified with the object identifier contained in the object instruction according to the object instruction, in a case where the object exists; and
a first transmitting portion that transmits result information, which is information acquired by the first object non-existence information acquiring portion or information on a result of the process executed by the first processing portion, to the second information processing apparatus; and
the second information processing apparatus includes:
a second non-existence case process information storage portion in which at least one piece of non-existence case process information having a pair of an object identifier and a non-existence case process identifier for identifying a process that is executed in a case where an object identified with the object identifier does not exist can be stored;
a second receiving portion that receives the result information transmitted by the first information processing apparatus;
a second processing portion that executes the process identified with the non-existence case process identifier corresponding to the object identifier of the object, in a case where the result information received by the second receiving portion is information to an effect that the object does not exist; and
a second output portion that outputs the result information received by the second receiving portion, in a case where the result information is not information to an effect that the object does not exist.

2. The information processing system according to claim 1, wherein a non-existence case process identifier for identifying a process that is executed in a case where information to an effect that the object does not exist is obtained is stored in the second non-existence case process information storage portion, and
the second processing portion executes the process identified with the non-existence case process identifier stored in the second non-existence case process information storage portion, in a case where the result information received by the second receiving portion is information to an effect that the object does not exist.

3. An information processing system, comprising:
a first information processing apparatus; and
a second information processing apparatus,
wherein the first information processing apparatus includes:
a first object storage portion in which at least one object having at least one data node and at least one application node that are hierarchical can be stored;
a first instruction receiving portion that receives an object instruction, which is an instruction having an object identifier for identifying an object and is an instruction for the object, from the second information processing apparatus;
a first structure information acquiring portion that acquires from a first object storage portion of the first information processing apparatus the object identified with the object identifier contained in the object instruction, or structure information identified with the object identifier contained in the object instruction, wherein the structure information is information relating to a structure of the object identified with the object identifier contained in the object instruction;
a first processing portion that executes an operation corresponding to the object instruction received by the first instruction receiving portion; and
a first transmitting portion that transmits a result of the operation executed by the first processing portion, or the object or the structure information acquired by the first structure information acquiring portion to the second information processing apparatus; and
the second information processing apparatus includes:
a second receiving portion that receives the object or the structure information transmitted by the first information processing apparatus;
a second processing portion that executes different processes depending on structure information acquired from the object received by the second receiving portion, or the structure information received by the second receiving portion; and
a second output portion that outputs a result of the process executed by the second processing portion.

4. The information processing system according to claim 3, wherein the second processing portion further includes:
structure and process information storage unit in which at least two pieces of structure and process information having a pair of a depth of a hierarchical structure of the object and a process identifier for identifying a process are stored; and
a process executing unit that executes the process identified with the process identifier corresponding to the depth of the hierarchical structure indicated by the structure information.

5. The information processing system according to claim 1, further comprising a third information processing apparatus,
wherein the third information processing apparatus includes:
a third object storage portion in which at least one object having a link from a node of one object of the first object storage portion can be stored;
a third instruction receiving portion that receives a link node group instruction, which is an instruction for a link-destination node, or the link-destination node and a node group therebelow, from the first information processing apparatus;
a third processing portion that executes a process corresponding to the link node group instruction, and acquires a processing result; and a third transmitting portion that transmits the processing result to the first information processing apparatus;

the second information processing apparatus further includes:

a second accepting portion that accepts the object instruction; and a second instruction transmitting portion that transmits the object instruction to the first information processing apparatus;

the first information processing apparatus further includes:

a first link object judging portion that judges whether or not the object corresponding to the object instruction is a link object;

a first link node group instruction transmitting portion that transmits the link node group instruction to the third information processing apparatus, which is a link-destination apparatus of the link object, in a case where the first link object judging portion judges that the object is the link object; and a first link-destination node group processing result receiving portion that receives a processing result of a link node group from the third information processing apparatus in response to transmission of the link node group instruction;

the first processing portion acquires result information, which is the processing result or a result of a process executed according to the processing result, and the first transmitting portion transmits the result information to the second information processing apparatus.

6. The information processing system according to claim 1, further comprising a third information processing apparatus, wherein the third information processing apparatus includes:

a third object storage portion in which at least one object having a link from a node of one object of the first object storage portion can be stored;

a third instruction receiving portion that receives a link node group instruction, which is an instruction for a link-destination node, or the link-destination node and a node group therebelow, from the second information processing apparatus;

a third processing portion that executes a process corresponding to the link node group instruction, and acquires result information, which is a processing result; and a third transmitting portion that transmits the result information to the second information processing apparatus;

the second information processing apparatus further includes:

a second accepting portion that accepts the object instruction; and a second instruction transmitting portion that transmits the object instruction to the first information processing apparatus;

the second receiving portion receives a link-destination node identifier for identifying the link-destination node from the first information processing apparatus in response to transmission of the object instruction, the second information processing apparatus further comprises a second transmitting portion that transmits the link node group instruction, which is an instruction to process a link-destination node group identified with the link-destination node identifier, to the third information processing apparatus corresponding to the link-destination node identifier, the second receiving portion receives the result information from the third information processing apparatus in response to transmission of the link node group instruction, the second output portion outputs the result information received by the second receiving portion, and the first information processing apparatus further includes:

a first instruction receiving portion that receives the object instruction;

a first link object judging portion that judges whether or not the object corresponding to the object instruction is a link object; and a first link node group instruction transmitting portion that transmits a link-destination node identifier for identifying the link-destination node to the second information processing apparatus, in a case where the link object judging portion judges that the object is the link object.

7. A first information processing apparatus constituting the information processing system according to claim 1.

8. A second information processing apparatus constituting the information processing system according to claim 1.

9. A third information processing apparatus constituting the information processing system according to claim 5.

10. A non-transitory storage medium readable by a computer, the non-transitory storage medium storing a program of instructions executable by the computer to perform a function comprising:

a first object storage portion that hierarchically stores at least one object having at least one data node and at least one application node;

a first instruction receiving portion that receives an object instruction, which is an instruction having an object identifier for identifying an object and is an instruction for the object, from a second information processing apparatus;

a first object non-existence information acquiring portion that judges whether or not the object identified with the object identifier exists in a first object storage portion of a first information processing apparatus, acquires information to an effect that the object identified with the object identifier contained in the object instruction does not exist, in a case where the object does not exist in the first object storage portion;

a first processing portion that processes the object identified with the object identifier contained in the object instruction according to the object instruction, in a case where the object exists;

a first transmitting portion that transmits result information, which is information acquired by the first object non-existence information acquiring portion or information on a result of the process executed by the first processing portion, to the second information processing apparatus;

a pair of an object identifier and a non-existence case process identifier for identifying a process that is executed in a case where an object identified with the object identifier does not exist;

a second receiving portion that receives result information transmitted by a first information processing apparatus;

a second processing portion that judges whether or not the result information received by the second receiving portion is information to an effect that the object does not exist in a first object storage portion of the first information processing apparatus, and executes the process identified with the non-existence case process identifier corresponding to the object identifier of the object, in a case where the result information received by the second receiving portion is information to an effect that the object does not exist; and a second output portion that outputs the result information received by the second receiving portion, in a case where the result information is not information to an effect that the object does not exist.

11. A non-transitory storage medium readable by a computer, the non-transitory storage medium storing a program of instructions executable by the computer to perform a function comprising:

a first object storage portion that hierarchically stores at least one object having at least one data node and at least one application node;

a first instruction receiving portion that receives an object instruction, which is an instruction having an object identifier for identifying an object and is an instruction for the object, from a second information processing apparatus;

a first structure information acquiring portion that acquires from a first object storage portion of a first information processing apparatus the object identified with the object identifier contained in the object instruction or structure information identified with the object identifier contained in the object instruction, wherein the structure information is information relating to a structure of the object identified with the object identifier contained in the object instruction;

a first processing portion that executes an operation corresponding to the object instruction received by the first instruction receiving portion;

a first transmitting portion that transmits a result of the operation executed by the first processing portion, or the object or the structure information acquired by the first structure information acquiring portion to the second information processing apparatus;

a second receiving portion that receives a result of an executed operation or an object or structure information transmitted by the first information processing apparatus, wherein the executed operation corresponds to an object instruction sent by the second information processing apparatus to the first information processing apparatus and executed by the first information processing apparatus;

a second processing portion that judges whether the object or the structure information was received by the second receiving portion, when the object is received, the second processing portion acquires the structure information from the object, wherein the second processing portion executes different processes depending on the structure information acquired from the object received by the second receiving portion, or the structure information received by the second receiving portion; and a second output portion that outputs a result of the process executed by the second processing portion.

12. A first information processing apparatus constituting the information processing system according to claim 3.

13. A second information processing apparatus constituting the information processing system according to claim 3.

14. A third information processing apparatus constituting the information processing system according to claim 6.

15. The information processing system according to claim 1, wherein the non-existence case process identifier is a process identifier that comprises a character string including one or more characters, which is substituted by the second processing portion with at least one data node that is part of the corresponding object identifier from the instruction.

16. The information processing system according to claim 1, wherein the first object storage portion comprises an external application, which is a root that comprises a plurality of nodes, and the at least one node that makes up the that at least one object is one or more of the plurality of nodes.

17. The information processing system according to claim 1, wherein the second information processing apparatus further includes a second instruction transmitting portion that transmits the object instruction to the first information processing apparatus.

18. The information processing system according to claim 1, wherein the second processing portion of the second information processing apparatus judges whether or not the result information transmitted by the first information processing apparatus is information to the effect that the object does not exist in the first object storage portion of the first information processing apparatus, when the object does not exist in the first object storage portion, the second processing portion executes the process identified with the non-existence case process identifier corresponding to the object identifier of the object.

* * * * *